US012451559B2

(12) United States Patent
Zhou et al.

(10) Patent No.: US 12,451,559 B2
(45) Date of Patent: Oct. 21, 2025

(54) PRESSURE RELIEF APPARATUS, BATTERY CELL, BATTERY, AND POWER CONSUMING DEVICE

(71) Applicant: CONTEMPORARY AMPEREX TECHNOLOGY (HONG KONG) LIMITED, Hong Kong (CN)

(72) Inventors: Wenlin Zhou, Ningde (CN); Ting Zheng, Ningde (CN); Wenzhong Liu, Ningde (CN); Kaihuan Yang, Ningde (CN); Quankun Li, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 112 days.

(21) Appl. No.: 18/464,845

(22) Filed: Sep. 11, 2023

(65) Prior Publication Data
US 2023/0420793 A1 Dec. 28, 2023

Related U.S. Application Data

(63) Continuation of application No. PCT/CN2022/116299, filed on Aug. 31, 2022.

(30) Foreign Application Priority Data

Aug. 31, 2022 (WO) ............... PCT/CN2022/116299

(51) Int. Cl.
H01M 50/249 (2021.01)
F16K 17/40 (2006.01)
(Continued)

(52) U.S. Cl.
CPC ....... H01M 50/3425 (2021.01); F16K 17/403 (2013.01); H01M 50/147 (2021.01);
(Continued)

(58) Field of Classification Search
CPC .......... H01M 50/3425; H01M 50/249; H01M 50/15; H01M 50/147; H01M 2200/20; H01M 2220/20
See application file for complete search history.

(56) References Cited

U.S. PATENT DOCUMENTS

2003/0028399 A1 2/2003 Davis et al.
2012/0040213 A1 2/2012 Byun et al.
(Continued)

FOREIGN PATENT DOCUMENTS

CN 107004805 A 8/2017
CN 207134411 U 3/2018
(Continued)

OTHER PUBLICATIONS

The World Intellectual Property Organization (WIPO) International Search Report and written opinion for PCT/CN2021/115766 May 7, 2022 10 pages (including English translation).
(Continued)

Primary Examiner — Jane J Rhee
(74) Attorney, Agent, or Firm — ANOVA LAW GROUP, PLLC

(57) ABSTRACT

A pressure relief apparatus includes a pressure relief portion provided with a first surface and a second surface arranged opposite to each other in a thickness direction of the pressure relief portion, and at least one stage of depressed groove and an indented groove. The at least one stage of depressed groove and the indented groove are formed in the pressure relief portion in sequence in a direction from the first surface to the second surface. A groove bottom wall of the stage of depressed groove farthest away from the first surface among the at least one stage of depressed groove is provided with an opening area. The indented groove is formed along an edge of the opening area. The opening area is configured to
(Continued)

be openable with the stage of indented groove farthest away from the first surface as a boundary.

20 Claims, 10 Drawing Sheets

(51) Int. Cl.
    *H01M 50/147*     (2021.01)
    *H01M 50/15*     (2021.01)
    *H01M 50/342*     (2021.01)

(52) U.S. Cl.
    CPC ......... *H01M 50/15* (2021.01); *H01M 50/249* (2021.01); *H01M 2200/20* (2013.01); *H01M 2220/20* (2013.01)

(56) References Cited

U.S. PATENT DOCUMENTS

| | | | |
|---|---|---|---|
| 2016/0079578 | A1 | 3/2016 | Tyler |
| 2020/0328399 | A1 | 10/2020 | Jiang et al. |
| 2020/0388806 | A1 | 12/2020 | Wang et al. |
| 2021/0175577 | A1 | 6/2021 | Shiotani et al. |

FOREIGN PATENT DOCUMENTS

| | | | |
|---|---|---|---|
| CN | 111033790 | A | 4/2020 |
| CN | 111446388 | A | 7/2020 |
| CN | 212136523 | U | 12/2020 |
| CN | 212461953 | U | 2/2021 |
| CN | 213340640 | U | 6/2021 |
| CN | 213546511 | U | 6/2021 |
| CN | 215989101 | U | 3/2022 |
| CN | 215989102 | U | 3/2022 |
| CN | 114447514 | A | 5/2022 |
| CN | 217182358 | U | 8/2022 |
| CN | 218414924 | U | 1/2023 |
| EP | 2328207 | A1 | 6/2011 |
| JP | S61143936 | U | 9/1986 |
| JP | H11204093 | A | 7/1999 |
| JP | 2000285892 | A | 10/2000 |
| JP | 2000348700 | A | 12/2000 |
| JP | 2004178820 | A | 6/2004 |
| JP | 2004178909 | A | 6/2004 |
| JP | 2005038709 | A | 2/2005 |
| JP | 2006351234 | A | 12/2006 |
| JP | 2009004271 | A | 1/2009 |
| JP | 2010165590 | A | 7/2010 |
| JP | 2012182008 | A | 9/2012 |
| JP | 2014049398 | A | 3/2014 |
| JP | 2014102935 | A | 6/2014 |
| JP | 2014116220 | A | 6/2014 |
| JP | 2015069716 | A | 4/2015 |
| JP | 5876794 | B2 | 3/2016 |
| JP | 2016157570 | A | 9/2016 |
| JP | 2016189248 | A | 11/2016 |
| JP | 3227978 | U | 10/2020 |

OTHER PUBLICATIONS

The World Intellectual Property Organization (WIPO) International Search Report and written opinion for PCT/CN2022/116275 Nov. 10, 2022 12 pages (including English translation).
The World Intellectual Property Organization (WIPO) International Search Report and written opinion for PCT/CN2022/116298 Nov. 10, 2022 12 pages (including English translation).
The World Intellectual Property Organization (WIPO) International Search Report and written opinion for PCT/CN2022/116299 Nov. 9, 2022 13 pages (including English translation).
The European Patent Office (EPO) Intention to grant for Application No. 21948694.1 Oct. 23, 2024 5 Pages.
Korean Intellectual Property Office (KIPO) Request for the Submission of an Opinion for Application No. 10-2023-7003696 Oct. 30, 2024 17 Pages (including translation).
The Japan Patent Office (JPO) Decision to Grant a Patent for Application No. 2023-528257 Dec. 10, 2024 6 Pages (including translation).
Korean Intellectual Property Office (KIPO) Request for the Submission of an Opinion for Application No. 10-2023-7015526 Nov. 27, 2024 16 Pages (including translation).
Korean Intellectual Property Office (KIPO) Request for the Submission of an Opinion for Application No. 10-2023-7016596 Nov. 27, 2024 14 Pages (including translation).
The Japan Patent Office (JPO) Decision to Grant a Patent for Application No. 2023-530008 Oct. 29, 2024 5 Pages (including translation).
Korean Intellectual Property Office (KIPO) Request for the Submission of an Opinion for Application No. 10-2023-7016558 Nov. 27, 2024 16 Pages (including translation).
Canadian Intellectual Property Office Office Action for Application No. 3183528 Jun. 12, 2024 4 Pages.
State Intellectual Property Office of China Notice of Grant of Utility Model Patent Rights for Application No. 202122087757.7, Jan. 6, 2022 2 pages (including translation).
The European Patent Office (EPO) The Extended European Search Report for Application No. 21948694.1, Apr. 15, 2024 8 Pages.
The Japan Patent Office (JPO) Decision to Grant a Patent for Application No. 2023-502626 Jun. 4, 2024 6 Pages(including translation).
The Japan Patent Office (JPO) Notification of Reasons for Refusal for Application No. 2023-502626 Feb. 27, 2024 9 Pages(including translation).
State Intellectual Property Office of China Notice of Grant of Utility Model Patent Rights for Application No. 202222314334.9 Nov. 18, 2022 2 pages (including translation).
The Japan Patent Office (JPO) Notification of Reasons for Refusal for Application No. 2023-528257 Jun. 4, 2024 12 Pages(including translation).
State Intellectual Property Office of China Notice of Grant of Utility Model Patent Rights for Application No. 202222326423.5 Jan. 6, 2023 2 pages (including translation).
The Japan Patent Office (JPO) Notification of Reasons for Refusal for Application No. 2023-530006 Jun. 11, 2024 7 Pages(including translation).
State Intellectual Property Office of China Notice of Grant of Utility Model Patent Rights for Application No. 202222314407.4 Nov. 18, 2022 2 pages (including translation).
The Japan Patent Office (JPO) Notification of Reasons for Refusal for Application No. 2023-530008 May 28, 2024 12 Pages(including translation).
State Intellectual Property Office of China Notice of First Examination Opinion for Application No. 202280005459.3 Jun. 18, 2024 10 pages (including translation).
The European Patent Office (EPO) The Extended European Search Report for Application No. 22863540.5 Jan. 17, 2025 10 Pages.
The European Patent Office (EPO) The Extended European Search Report for Application No. 22863539.7 Jan. 17, 2025 9 Pages.
The European Patent Office (EPO) The Extended European Search Report for Application No. 22863534.8 Jan. 28, 2025 10 Pages.
The Japan Patent Office (JPO) Notice of Reasons for Refusal for Application No. 2023-530006 Jan. 7, 2025 6 Pages (including translation).
State Intellectual Property Office of China The First Office Action for Application No. 202180066181.6 May 24, 2025 16 pages (including translation).

PRESSURE RELIEF APPARATUS, BATTERY CELL, BATTERY, AND POWER CONSUMING DEVICE

CROSS-REFERENCE TO RELATED APPLICATIONS

The present application is a continuation of International Application No. PCT/CN2022/116299, filed on Aug. 31, 2022, which claims priority to International Application No. PCT/CN2021/115766, entitled "PRESSURE RELIEF APPARATUS, BATTERY CELL, BATTERY, AND POWER CONSUMING DEVICE", filed on Aug. 31, 2021, which are incorporated herein by reference in their entirety.

TECHNICAL FIELD

The present application relates to the technical field of batteries, and in particular to a pressure relief apparatus, a battery cell, a battery and a power consuming device.

BACKGROUND ART

Batteries are widely used in electronic devices, such as mobile phones, notebook computers, electric mopeds, electric vehicles, electric aircraft, electric ships, electric toy vehicles, electric toy ships, electric toy aircrafts, and electric tools.

In the battery technology, in order to ensure the safety of a battery cell, a pressure relief apparatus is typically provided in the battery cell. When the internal pressure or temperature of the battery cell reaches a threshold value, the pressure relief apparatus will be broken at the position where an indented groove is provided, so as to relieve the pressure from the inside of the battery cell. For a general pressure relief apparatus, a pressure relief phenomenon may also occur when the pressure inside the battery cell is within a normal range, resulting in a poor long-term reliability.

SUMMARY

Embodiments of the present application provide a pressure relief apparatus, a battery cell, a battery and a power consuming device, which can effectively improve the long-term reliability of the pressure relief apparatus.

In a first aspect, the embodiments of the present application provide a pressure relief apparatus, including a pressure relief portion, at least one stage of depressed groove and at least one stage of indented groove. The pressure relief portion is provided with a first surface and a second surface arranged opposite to each other in a thickness direction thereof. The at least one stage of depressed groove and the at least one stage of indented groove are formed in the pressure relief portion in sequence in a direction from the first surface to the second surface. A groove bottom wall of the stage of depressed groove farthest away from the first surface is provided with an opening area, the indented groove is formed along an edge of the opening area, and the opening area is configured to be openable with the stage of indented groove farthest away from the first surface as a boundary.

In the above technical solution, at least one stage of depressed groove and at least one stage of indented groove are formed in the pressure relief portion in sequence in the direction from the first surface to the second surface, and during forming, depressed grooves and the indented grooves can be formed stage by stage, so that the pressure relief portion is subjected to a reduced forming force, the risk of cracking of the pressure relief portion is reduced, the pressure relief apparatus is less likely to fail due to cracking occurring at the position where an indented groove is provided, and the long-term reliability of the pressure relief apparatus is thus improved.

In some embodiments, the indented groove includes a first groove segment, a second groove segment and a third groove segment, the first groove segment and the second groove segment being arranged opposite to each other, the first groove segment and the second groove segment both intersecting with the third groove segment, and the first groove segment, the second groove segment and the third groove segment being arranged along the edge of the opening area. In this way, the opening area can be opened with the first groove segment, the second groove segment and the third groove segment as a boundary, increasing the pressure relief area of the pressure relief portion and increasing the pressure relief rate of the pressure relief portion.

In some embodiments, the pressure relief portion is provided with a fourth groove segment, the fourth groove segment being located between the first groove segment and the second groove segment and intersecting with the third groove segment. A stress is more concentrated at the intersection of the fourth groove segment and the third groove segment, and breakage is thus more likely to occur, so that the pressure relief portion is broken along the third groove segment from an intersection position of the third groove segment and the fourth groove segment during the pressure relief, and then broken along the first groove segment and the second groove segment after being broken along the third groove segment, to achieve quick pressure relief.

In some embodiments, the fourth groove segment intersects with the third groove segment at the intersection position, and in an extending direction of the third groove segment, a distance from the intersection position to the first groove segment is equal to a distance from the intersection position to the second groove segment. In this way, the pressure relief portion can be simultaneously broken along the first groove segment and the second groove segment after being broken at the intersection position of the fourth groove segment and the third groove segment along the third groove segment, enabling the opening area to be opened more quickly.

In some embodiments, the pressure relief portion is provided with a fifth groove segment formed in a bottom surface of one or two of the first groove segment, the second groove segment and the third groove segment in the stage of indented groove farthest away from the first surface. The pressure relief portion is weaker at the position where the fifth groove segment is provided and is more prone to breakage, so that the pressure relief portion is broken first along the fifth groove segment and then along the other groove segments than the fifth groove segment during the pressure relief, thereby improving the timeliness of pressure relief.

In some embodiments, the first groove segment, the second groove segment and the third groove segment jointly define at least one opening area. The opening area is defined by the first groove segment, the second groove segment and the third groove segment together, and the opening area can be opened by turning same. After being opened, the opening area is always connected to other areas of the pressure relief portion and is less likely to fall off, so as to reduce the risk of splashing after the opening area is opened.

In some embodiments, the first groove segment, the second groove segment and the third groove segment define two opening areas respectively located on two sides of the third groove segment. During the pressure relief of the pressure relief portion, the potions of the pressure relief portion in the two opening areas can be opened against each other for pressure relief, increasing the pressure relief area. The pressure relief rate of the pressure relief portion can be effectively increased.

In some embodiments, the indented groove further includes a sixth groove segment arranged opposite to the third groove segment, the first groove segment and the second groove segment both intersect with the sixth groove segment, and the first groove segment, the second groove segment, the third groove segment and the sixth groove segment jointly define the opening area. In this way, the opening area is a closed area defined by the first groove segment, the second groove segment, the third groove segment and the sixth groove segment, and the pressure relief portion can be broken along the first groove segment, the second groove segment, the third groove segment and the sixth groove segment during the pressure relief of the pressure relief portion, so that the opening area can be opened in a disengaged manner, increasing the pressure relief area of the pressure relief portion and the pressure relief rate of the pressure relief portion.

In some embodiments, the indented groove is a non-closed groove extending along a non-closed trajectory that is not connected end to end. In this way, the opening area can be opened by turning same. After being opened, the opening area is always connected to other areas of the pressure relief portion and is less likely to fall off, so as to reduce the risk of splashing after the opening area is opened.

In some embodiments, the indented groove has a circular arc shape. The circular arc-shaped indented groove has a simple structure and is easy to form. At the time of pressure relief, the pressure relief portion can be quickly broken along the circular arc-shaped indented groove to allow the opening area to be quickly opened.

In some embodiments, the indented groove is a closed groove extending along a closed trajectory that is connected end to end. During the pressure relief of the pressure relief portion, the pressure relief portion can be broken along the indented groove so that the opening area can be opened in a disengaged manner, increasing the pressure relief area of the pressure relief portion and the pressure relief rate of the pressure relief portion.

In some embodiments, the indented groove has a circular ring shape. The circular ring-shaped indented groove has a simple structure and is easy to form. At the time of pressure relief, the pressure relief portion can be quickly broken along the circular ring-shaped indented groove to allow the opening area to be quickly opened.

In some embodiments, the pressure relief portion is provided with one stage of depressed groove formed in the first surface. The pressure relief portion is provided with one stage of depressed groove, so that forming is simple, the production efficiency is improved, and the production cost is reduced.

In some embodiments, the pressure relief portion is provided with one stage of indented groove formed in a bottom surface of the depressed groove. The pressure relief portion is provided with one stage of indented groove, so that the forming is simple, the production efficiency is improved, and the production cost is reduced.

In some embodiments, the pressure relief portion is provided with a plurality of stages of indented grooves formed in sequence in the direction from the first surface to the second surface; and among two adjacent stages of indented grooves, the stage of indented groove away from the first surface is formed in a bottom surface of the stage of indented groove close to the first surface, and the stage of indented groove closest to the first surface is formed in the bottom surface of the depressed groove. The plurality of stages of indented grooves are formed in sequence in the direction from the first surface to the second surface, so that the forming depth of each stage of indented groove can be decreased, the pressure relief portion is thus subjected to a reduced forming force during the forming of each stage of indented groove, and the risk of cracking of the pressure relief portion is reduced. During the stage-by-stage machining of the plurality of stages of indented grooves in the direction from the first surface to the second surface, the rigidity of the remaining portion of the area of the pressure relief portion provided with the indented grooves is accordingly increased as each stage of indented groove is machined, and the rigidity of the remaining portion is increased after the pressure relief portion is provided with the plurality of stages of indented grooves, so that the long-term reliability and the impact resistance are better, and the probability of damage due to external impact is reduced.

In some embodiments, the pressure relief portion is provided with two or three stages of indented grooves.

In some embodiments, the pressure relief portion is provided with a plurality of stages of depressed grooves formed in sequence in the direction from the first surface to the second surface, and among two adjacent stages of depressed grooves, the stage of depressed groove away from the first surface is formed in a bottom surface of the stage of depressed groove close to the first surface; wherein in the thickness direction, the outermost stage of depressed groove is formed in the first surface. Thanks to the fact that the pressure relief portion is provided with a plurality of stages of depressed grooves, the forming depth of each stage of depressed groove can be relatively small, the pressure relief portion can be subjected to a reduced forming force during the forming of each stage of depressed groove, and the risk of cracking of the pressure relief portion can be reduced. During the stage-by-stage machining of the plurality of stages of depressed grooves in the direction from the first surface to the second surface, the rigidity of the remaining portion of the area of the pressure relief portion provided with the depressed grooves is accordingly increased as each stage of depressed groove is machined, so that the rigidity of the remaining portion of the area of the pressure relief portion provided with the indented grooves is further increased.

In some embodiments, the pressure relief portion is provided with one stage of indented groove formed in a bottom surface of the stage of depressed groove farthest away from the first surface in the thickness direction. The pressure relief portion is provided with one stage of indented groove, so that forming is simple, the production efficiency is improved, and the production cost is reduced.

In some embodiments, the pressure relief portion is provided with a plurality of stages of indented grooves formed in sequence in the direction from the first surface to the second surface, and among two adjacent stages of indented grooves, the stage of indented groove away from the first surface is formed in the bottom surface of the stage of indented groove close to the first surface, and the stage of indented groove closest to the first surface is formed in a bottom surface of the stage of depressed groove farthest away from the first surface. The plurality of stages of indented grooves are formed in sequence in the direction from the first surface to the second surface, so that the forming depth of each stage of indented groove can be decreased, the pressure relief portion is thus subjected to a reduced forming force during the forming of each stage of indented groove, and the risk of cracking of the pressure relief portion is reduced. During the stage-by-stage machining of the plurality of stages of indented grooves in the direction from the first surface to the second surface, the rigidity of the remaining portion of the area of the pressure relief portion provided with the indented grooves is accordingly increased as each stage of indented groove is machined, and the rigidity of the remaining portion is increased after the pressure relief portion is provided with the plurality of stages of indented grooves, so that the long-term reliability and the impact resistance are better, and the probability of damage due to external impact is reduced.

In some embodiments, the pressure relief portion is provided with two or three stages of indented grooves.

In some embodiments, the pressure relief portion is provided with two or three stages of depressed grooves.

In some embodiments, the pressure relief portion is provided with a plurality of stages of indented grooves formed in sequence in the direction from the first surface to the second surface, and among two adjacent stages of indented grooves, the stage of indented groove away from the first surface has a maximum width less than a minimum width of the stage of indented groove close to the first surface. During forming, all the stages of indented grooves may be formed in sequence in the direction from the first surface to the second surface to facilitate the forming of each stage of indented groove.

In some embodiments, the depressed groove is a rectangular groove or a circular groove. The depressed groove has a simple structure and is easy to form, and can provide more avoidance space for the opening of the opening area.

In some embodiments, the first surface is provided with a flange which surrounds the depressed groove formed in the first surface. The flange can reinforce the pressure relief portion and improve the deformation resistance of a pressure relief area of the pressure relief portion. In addition, the arrangement of the flange facilitates the mounting of a protective member to protect the opening area.

In some embodiments, the pressure relief portion partially protrudes from the second surface in a direction away from the first surface to form a protrusion; and the protrusion includes the groove bottom wall and a reinforcement, the reinforcement being connected to the second surface and surrounding the groove bottom wall. The reinforcement is connected to the second surface, and can function to reinforce the groove bottom wall, improve the deformation resistance of the groove bottom wall, and reduce the risk of damage at the position of the groove bottom wall provided with the indented groove due to a stress.

In some embodiments, the second surface is provided with a recess arranged around the protrusion. Thanks to the provision of the recess, the energy that is transferred by the stressed pressure relief portion to the protrusion can be absorbed, and even if the pressure relief portion deforms, it is less likely to transfer energy to the area provided with the indented groove.

In some embodiments, in the thickness direction, the protrusion protrudes from the second surface by a height of $H_1$, and the distance between the first surface and the second surface is represented by $H_2$, where $H_1 \geq H_2$. In this way, the height of the protrusion protruding from the second surface is larger, enhancing the reinforcing effect of the reinforcement on the groove bottom wall.

In some embodiments, the pressure relief portion is an end cap for closing an opening of a housing. In this way, the end cap has a pressure relief function, a pressure relief structure is formed by forming an indented groove in the end cap, and the pressure relief structure has a better stability and a good long-term reliability.

In some embodiments, the first surface is the surface of the end cap facing away from the housing.

In some embodiments, the pressure relief apparatus is a housing, a receiving space is formed inside the housing, the housing includes a plurality of wall portions which jointly define the receiving space for receiving an electrode assembly, and at least one of the wall portions is the pressure relief portion. With such a structure, the pressure relief apparatus has both a receiving function for receiving an electrode assembly and a pressure relief function.

In some embodiments, the housing includes a peripheral wall and a bottom wall, the peripheral wall surrounding an edge of the bottom wall, the peripheral wall and the bottom wall jointly defining the receiving space, an opening being formed at the end of the peripheral wall opposite to the bottom wall, and the bottom wall being the pressure relief portion. In this way, the bottom wall of the pressure relief apparatus has the pressure relief function, facilitating the release of the pressure from the inside of the receiving space.

In some embodiments, the first surface is an outer surface of the wall portion. In this way, the depressed groove and the indented groove can be formed in the outer side of the wall portion, facilitating the machining of the depressed groove and the indented groove in the bottom wall.

In a second aspect, the embodiments of the present application provide a battery cell, including a pressure relief apparatus according to any one of the embodiments in the first aspect described above.

In a third aspect, the embodiments of the present application provide a battery, including a battery cell according to any one of the embodiments in the second aspect described above.

In a fourth aspect, the embodiments of the present application provide a power consuming device, including a battery according to any one of the embodiments in the third aspect described above.

BRIEF DESCRIPTION OF THE DRAWINGS

In order to more clearly describe the technical solutions of the embodiments of the present application, the accompanying drawings required in the embodiments will be described briefly below. It should be understood that the following accompanying drawings illustrate only some embodiments of the present application and therefore should not be construed as a limitation on the scope thereof. For those of ordinary skill in the art, other relevant accompanying drawings can also be obtained from these accompanying drawings without any creative effort.

Figure 1:
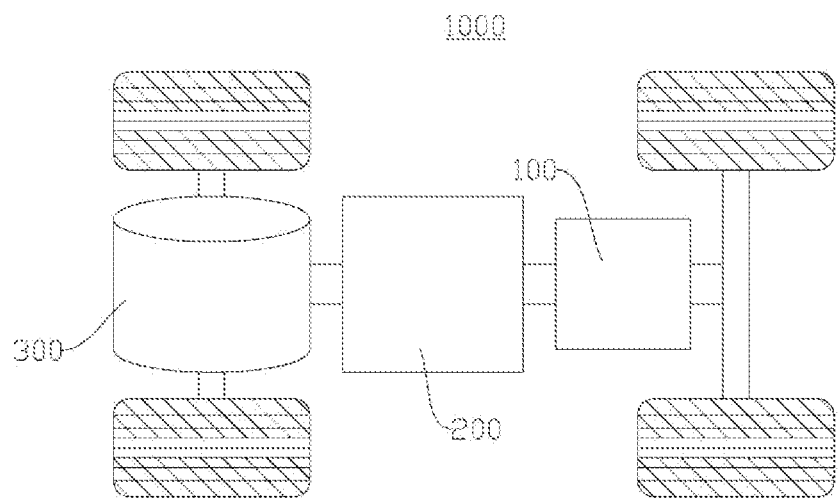
FIG. 1 is a schematic structural diagram of a vehicle according to some embodiments of the present application.

List of reference signs: 1—Housing; 2—Electrode assembly; 21—Positive tab; 22—Negative tab; 3—End cap; 31—Positive electrode terminal; 32—Negative electrode terminal; 4—Current collecting member; 5—Insulator; 6—Pressure relief apparatus; 61—Pressure relief portion; 611—First surface; 6111—Flange; 612—Second surface; 6121—Protrusion; 6121a—Reinforcement; 6122—Recess; 613—Groove bottom wall; 6131—Opening area; 62—Depressed groove; 63—Indented groove; 631—First groove segment; 632—Second groove segment; 633—Third groove segment; 634—Sixth groove segment; 64—Fourth groove segment; 65—Fifth groove segment; 66—Notched groove; 67—Peripheral wall; 68—Bottom wall; 10—Battery cell; 20—Case; 201—First portion; 202—Second portion; 100—Battery; 200—Controller; 300—Motor; 1000—Vehicle; Z—Thickness direction.

DETAILED DESCRIPTION OF EMBODIMENTS

In order to make the objectives, technical solutions and advantages of the embodiments of the present application clearer, the technical solutions in the embodiments of the present application will be described clearly below with reference to the drawings in the embodiments of the present application. Obviously, the embodiments described are some of, rather than all of, the embodiments of the present application. All the other embodiments obtained by those of ordinary skill in the art based on the embodiments of the present application without any creative effort shall fall within the scope of protection of the present application.

Unless otherwise defined, all technical and scientific terms used in the present application have the same meanings as those commonly understood by those skilled in the art to which the present application belongs. The terms used in the description of the present application are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion. The terms "first", "second", etc. in the description and the claims of the present application as well as the foregoing accompanying drawings are used to distinguish between different objects, rather than describing a specific order or a primary-secondary relationship.

In the present application, "embodiment" mentioned means that the specific features, structures and characteristics described in conjunction with the embodiments may be included in at least one embodiment of the present application. The phrase at various locations in the description does not necessarily refer to the same embodiment, or an independent or alternative embodiment exclusive of another embodiment.

In the description of the present application, it should be noted that, the terms "mount", "connected", "connect", or "attach" should be interpreted in a broad sense unless explicitly defined and limited otherwise. For example, they may be a fixed connection, a detachable connection, or an integral connection; or may be a direct connection, an indirect connection by means of an intermediate medium, or internal communication between two elements. For those of ordinary skill in the art, the specific meaning of the foregoing term in the present application may be understood according to specific circumstances.

The term "and/or" in the present application is merely a description of the associated relationship of associated objects, representing that three relationships may exist. For example, A and/or B, may be expressed as: the three instances of A alone, A and B simultaneously, and B alone. In addition, the character "/" in the present application generally indicates that the associated objects before and after the character are in a relationship of "or".

In the embodiments of the present application, the same reference numerals denote the same components, and for the sake of brevity, the detailed description of the same components is omitted in different embodiments. It should be understood that the dimensions, such as thickness, length and width, of the various components in the embodiments of the present application illustrated in the accompanying drawings, as well as the dimensions, such as an overall thickness, length and width, of an integrated apparatus are merely illustrative and should not be construed to limit the present application in any way.

"A plurality of" appearing in the present application means two or more (including two).

In the present application, a battery cell may include a lithium ion secondary battery, a lithium ion primary battery, a lithium-sulfur battery, a sodium-lithium ion battery, a sodium ion battery, a magnesium ion battery, etc., which will not be limited in the embodiments of the present application. The battery cell may be cylindrical, flat, cuboid or in another shape, which will also not be limited in the embodiments of the present application. The battery cells are generally classified into three types depending on the way of package: cylindrical battery cells, prismatic battery cells and pouch battery cells, which also will not be limited in the embodiments of the present application.

A battery mentioned in the embodiments of the present application refers to a single physical module including one or more battery cells to provide a high voltage and capacity. For example, the battery mentioned in the present application may include a battery module, a battery pack, etc. The battery generally includes a case for enclosing one or more battery cells. The case can prevent liquid or other foreign matters from affecting the charging or discharging of a battery cell.

The battery cell includes an electrode assembly and an electrolyte. The electrode assembly is composed of a positive electrode plate, a negative electrode plate and a separator. The battery cell operates mainly by relying on movements of metal ions between the positive electrode plate and the negative electrode plate. The positive electrode plate includes a positive electrode current collector and a positive electrode active material layer. A surface of the positive electrode current collector is coated with the positive electrode active material layer, the positive electrode current collector not coated with the positive electrode active material layer protrudes from the positive electrode current collector coated with the positive electrode active material layer, and the positive electrode current collector not coated with the positive electrode active material layer serves as a positive tab. Taking a lithium ion battery as an example, the material of the positive electrode current collector may be aluminum, and the positive electrode active material may be lithium cobalt oxides, lithium iron phosphate, ternary lithium or lithium manganate, etc. The negative electrode plate includes a negative electrode current collector and a negative electrode active material layer. A surface of the negative electrode current collector is coated with the negative electrode active material layer, the negative electrode current collector not coated with the negative electrode active material layer protrudes from the negative electrode current collector coated with the negative electrode active material layer, and the negative electrode current collector not coated with the negative electrode active material layer serves as a negative tab. The negative electrode current collector may be made of copper, and the negative electrode active material may be carbon, silicon, etc. In order to ensure that no fusing occurs when a large current passes, a plurality of positive tabs are provided and are stacked together, and a plurality of negative tabs are provided and are stacked together. The separator may be made of PP (polypropylene), PE (polyethylene), etc. In addition, the electrode assembly may be of a wound structure or a laminated structure, which will not be limited in the embodiments of the present application.

Design factors on many aspects need to be simultaneously considered for the development of the battery technology, such as energy density, cycling life, discharge capacity, charge-discharge rate, and other performance parameters. In addition, the safety of the battery needs to be taken into account.

A pressure relief apparatus on the battery cell has an important influence on the safety of the battery. For example, when short circuit, overcharge and other phenomena occur, it may lead to thermal runaway inside the battery cell, resulting in a sudden increase in pressure or temperature. In this case, the internal pressure and heat can be released outward by means of the actuation of a pressure relief mechanism to prevent the battery cell from exploding and catching fire.

The inventors have found that in a general battery cell, a pressure relief phenomenon may also occur in the pressure relief apparatus when the internal pressure of the battery cell is within a normal range, resulting in failure of the battery cell. The inventors have further found that the pressure relief apparatus is typically provided with indented grooves at a pressure relief portion, it is necessary to machine deeper indented grooves in order to ensure that the pressure relief apparatus can normally relieve a pressure when the internal pressure or temperature of the battery cell reaches a threshold value, and cracks are easily generated after the indented grooves are formed in the pressure relief portion, so that the pressure relief apparatus may relieve the pressure when the internal pressure of the battery cell is within the normal range (not reaching the threshold value).

In view of this, the embodiments of the present application provide a pressure relief apparatus. At least one stage of depressed groove and at least one stage of indented groove are arranged on a pressure relief portion of the pressure relief apparatus in sequence in a direction from a first surface to a second surface, a groove bottom wall of the stage of depressed groove farthest away from the first surface is provided with an opening area, the indented groove is formed along an edge of the opening area, and the opening area is configured to be openable with the stage of indented groove farthest away from the first surface as a boundary.

In such a pressure relief apparatus, at least one stage of depressed groove and at least one stage of indented groove are formed in the pressure relief portion in sequence in the direction from the first surface to the second surface, and during forming, depressed grooves and the indented grooves can be formed stage by stage, so that the pressure relief portion is subjected to a reduced forming force, the risk of cracking of the pressure relief portion is reduced, the pressure relief apparatus is less likely to fail due to cracking occurring at the position where an indented groove is provided, and the long-term reliability of the pressure relief apparatus is thus improved.

The pressure relief apparatus described in the embodiments of the present application is applicable to a battery and a power consuming device using the battery.

The power consuming device may be a vehicle, a mobile phone, a portable device, a notebook computer, a ship, a spacecraft, an electric toy, an electric tool, etc. The vehicle may be a fuel vehicle, a gas vehicle or a new-energy vehicle. The new-energy vehicle may be a battery electric vehicle, a hybrid vehicle, an extended-range vehicle, etc. The spacecraft includes an airplane, a rocket, an aerospace plane, a spaceship, etc. The electric toy includes a stationary or mobile electric toy, such as a game machine, an electric toy car, an electric toy ship, and an electric toy airplane. The electric tool includes a metal cutting electric tool, a grinding electric tool, an assembling electric tool, and a railway electric tool, such as an electric drill, an electric grinder, an electric wrench, an electric screwdriver, an electric hammer, an electric impact drill, a concrete vibrator, and an electric planer. The power consuming devices mentioned above are not specially limited in the embodiments of the present application.

For ease of description, an example in which the power consuming device refers to a vehicle is used for description in the following embodiments.

Referring to FIG. 1, FIG. 1 is a schematic structural diagram of a vehicle 1000 provided in some embodiments of the present application. A battery 100 is provided inside the vehicle 1000, and the battery 100 may be provided at the bottom, the front or the back of the vehicle 1000. The battery 100 may be configured to supply power to the vehicle 1000. For example, the battery 100 may be used as an operating power supply of the vehicle 1000.

The vehicle 1000 may further include a controller 200 and a motor 300. The controller 200 is configured to control the battery 100 to supply power to the motor 300, for example, to meet working power requirements during starting, navigation and traveling of the vehicle 1000.

In some embodiments of the present application, the battery 100 can not only serve as a power supply for operating the vehicle 1000, but also serve as a power supply for driving the vehicle 1000, in place of or partially in place of fuel or natural gas, to provide driving power for the vehicle 1000.

Figure 2:
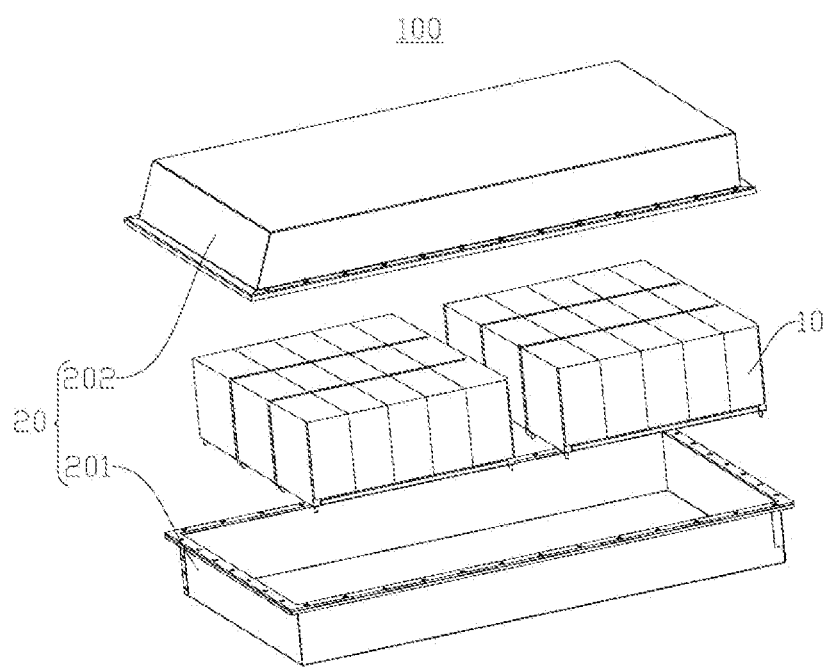
FIG. 2 is a schematic structural diagram of a battery according to some embodiments of the present application.

Referring to FIG. 2, FIG. 2 is a schematic structural diagram of the battery 100 provided in some embodiments of the present application. The battery 100 includes a battery cell 10 and a case 20. The case 20 is configured to receive the battery cell 10.

The case 20 herein is a component for receiving the battery cell 10, the case 20 provides an accommodating space for the battery cell 10, and the case 20 may be of various structures. In some embodiments, the case 20 may include a first portion 201 and a second portion 202, and the first portion 201 and the second portion 202 are covered each other to define the accommodating space for receiving the battery cell 10. The first portion 201 and the second portion 202 may have various shapes such as a cuboid and a cylinder. The first portion 201 may be of a hollow structure with one side open, the second portion 202 may also be of a hollow structure with one side open, and the open side of the second portion 202 covers the open side of the first portion 201, such that the case 20 having the accommodating space is formed. It is also possible that the first portion 201 may be of a hollow structure with one side open, the second portion 202 may be of a plate-like structure, and the second portion 202 covers the open side of the first portion 201, such that the case 20 having the accommodating space is formed. The first portion 201 and the second portion 202 may be sealed by means of a sealing element, which may be a sealing ring, a sealant, etc.

In the battery 100, one or more battery cells 10 may be provided. If a plurality of battery cells 10 are provided, the plurality of battery cells 10 may be connected in series, in parallel, or in series-parallel. The series-parallel connection refers that some of the plurality of battery cells 10 are connected in series and the rest are connected in parallel. It is possible that a plurality of battery cells 10 are first connected in series or in parallel or in series-parallel to form a battery module, and a plurality of battery modules are then connected in series or in parallel or in series-parallel connection to form a whole and are accommodated in the case 20. It is also possible that all the battery cells 10 are directly connected in series, or in parallel, or in series-parallel, and the unit composed of all the battery cells 10 is then received in the case 20.

In some embodiments, the battery 100 may further include a busbar component, and the plurality of battery cells 10 may be electrically connected by means of the busbar component, so as to implement series connection, parallel connection, or series-parallel connection of the plurality of battery cells 10. The busbar component may be a metal conductor such as a copper conductor, an iron conductor, an aluminum conductor, a stainless steel conductor, and an aluminum alloy conductor.

Figure 3:
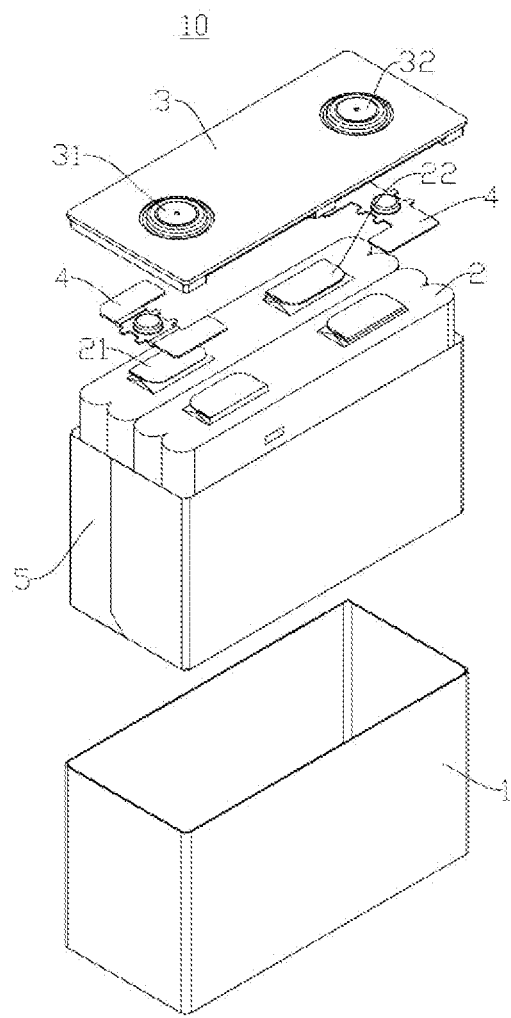
FIG. 3 is an exploded view of a battery cell according to some embodiments of the present application.

Referring to FIG. 3, FIG. 3 is an exploded view of the battery cell 10 provided in some embodiments of the present application. The battery cell 10 includes a housing 1, an electrode assembly 2, an end cap 3, an insulator 5, and a pressure relief apparatus 6 (not shown in FIG. 3).

The housing 1 is a component for receiving the electrode assembly 2, and the housing 1 may be of a hollow structure having an opening formed at one end. The housing 1 may have various shapes such as a cylinder and a cuboid. The housing 1 may be made of various materials, such as copper, iron, aluminum, steel, and aluminum alloy.

One or more electrode assemblies 2 may be provided in the housing 1. For example, as shown in the figures, a plurality of electrode assemblies 2 are provided, and the plurality of electrode assemblies 2 are arranged in the housing 1 in a stacked manner.

The electrode assembly 2 is a component, where an electrochemical reaction occurs, in the battery cell 10. The electrode assembly 2 may include a positive electrode plate, a negative electrode plate, and a separator. The electrode assembly 2 may be of a winding structure formed by winding the positive electrode plate, the separator and the negative electrode plate, or a laminated structure formed by laminating the positive electrode plate, the separator and the negative electrode plate.

The positive electrode plate may include a positive electrode current collector and positive electrode active material layers coated on two opposite sides of the positive electrode current collector. The negative electrode plate may include a negative electrode current collector and negative electrode active material layers coated on two opposite sides of the negative electrode current collector. The electrode assembly 2 is provided with a positive tab 21 and a negative tab 22. The positive tab 21 may be a portion of the positive electrode plate that is not coated with the positive electrode active material layer, and the negative tab 22 may be a portion of the negative electrode plate that is not coated with the negative electrode active material layer.

The end cap 3 is a component that covers an opening of the housing 1 to isolate an internal environment of the battery cell 10 from an external environment. The end cap 3 covers the opening of the housing 1, and the end cap 3 and the housing 1 together define a sealed space for receiving the electrode assembly 2, the electrolyte and other components. The end cap 3 may be shaped to adapt to the shape of the housing 1. For example, the housing 1 is of a cuboid structure, and the end cap 3 is of a rectangular plate-like structure adapted to the housing 1. For another example, the housing 1 is of a cylinder structure, and the end cap 3 is of a circular plate-like structure adapted to the housing 1. The end cap 3 may also be made of various materials, such as copper, iron, aluminum, steel, and aluminum alloy. The end cap 3 may be of the same material as or a different material from the housing 1.

The end cap 3 may be provided with an electrode terminal. The electrode terminal is configured to be electrically connected to the electrode assembly 2, so as to output electric energy of the battery cell 10. The electrode terminal may include a positive electrode terminal 31 and a negative electrode terminal 32. The positive electrode terminal 31 is configured to be electrically connected to the positive tab 21, and the negative electrode terminal 32 is configured to be electrically connected to the negative tab 22. The positive electrode terminal 31 may be directly or indirectly connected to the positive tab 21, and the negative electrode terminal 32 may be directly or indirectly connected to the negative tab 22. Illustratively, the positive electrode terminal 31 is electrically connected to the positive tab 21 by means of a current collecting member 4, and the negative electrode terminal 32 is electrically connected to the negative tab 22 by means of another current collecting member 4.

The insulator 5 is a component that insulates the housing 1 from the electrode assembly 2, and insulation and isolation of the housing 1 from the electrode assembly 2 are achieved by the insulator 5. The insulator 5 is made of an insulating material, and the insulator 5 may be made of an insulating material such as plastic and rubber. Illustratively, the outer periphery of the electrode assembly 2 is circumferentially wrapped with the insulator 5. It can be understood that, when a plurality of electrode assemblies 2 are provided, the outer periphery of the plurality of electrode assemblies 2 as a whole is circumferentially wrapped with the insulator 5.

The pressure relief apparatus 6 is a component for releasing a pressure from the inside of the battery cell 10, and the pressure inside the battery cell 10 is released by means of the pressure relief apparatus 6 when the pressure or temperature inside the battery cell 10 reaches a threshold value. The pressure relief apparatus 6 may be a component arranged on the end cap 3. It is also possible that the housing 1 serves as the pressure relief apparatus 6, or the end cap 3 serves as the pressure relief apparatus 6. A specific structure of the pressure relief apparatus 6 will be described in detail below with reference to the drawings.

Figure 4:
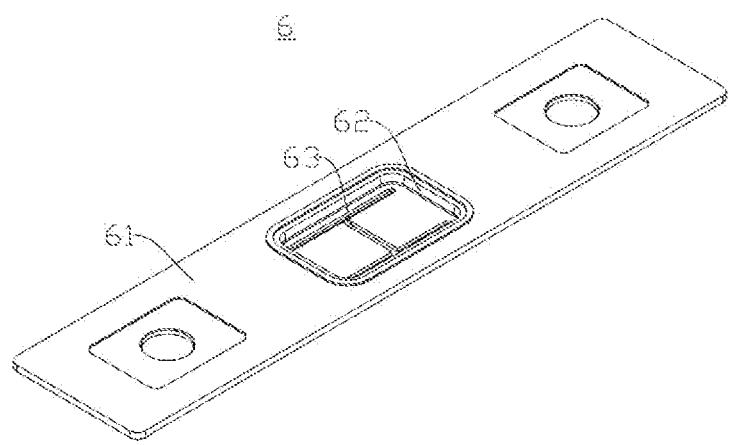
FIG. 4 is an isometric view of a pressure relief apparatus according to some embodiments of the present application.
Figure 5:
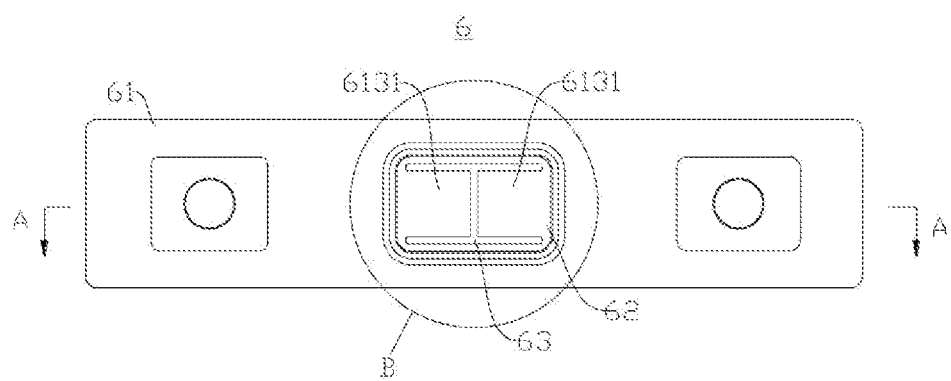
FIG. 5 is a top view of the pressure relief apparatus shown in FIG. 4.
Figure 6:
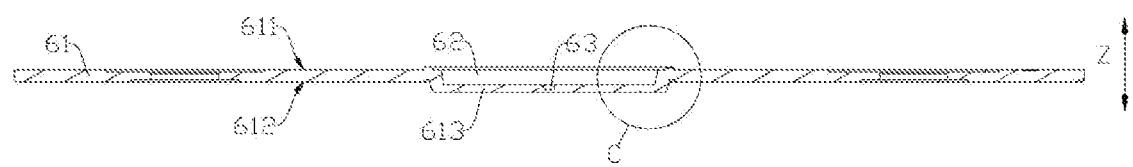
FIG. 6 is a cross-sectional view taken along A-A of the pressure relief apparatus shown in FIG. 5.

Referring to FIGS. 4-6, FIG. 4 is an isometric view of the pressure relief apparatus 6 provided in some embodiments of the present application, FIG. 5 is a top view of the pressure relief apparatus 6 shown in FIG. 4, and FIG. 6 is a cross-sectional view taken along A-A of the pressure relief apparatus 6 shown in FIG. 5. The embodiments of the present application provide a pressure relief apparatus 6, including a pressure relief portion 61, at least one stage of depressed groove 62 and at least one stage of indented groove 63. The pressure relief portion 61 is provided with a first surface 611 and a second surface 612 arranged opposite to each other in a thickness direction Z thereof. The at least one stage of depressed groove 62 and the at least one stage of indented groove 63 are formed in the pressure relief portion 61 in sequence in a direction from the first surface 611 to the second surface 612. A groove bottom wall 613 of the stage of depressed groove 62 farthest away from the first surface 611 is provided with an opening area 6131, the indented groove 63 is formed along an edge of the opening area 6131, and the opening area 6131 is configured to be openable with the stage of indented groove 63 farthest away from the first surface 611 as a boundary.

The pressure relief portion 61 may be a component mounted on the end cap 3. For example, the pressure relief portion 61 is an explosion-proof sheet mounted on the end cap 3; the pressure relief portion 61 may also integrally serve as the end cap 3; or the pressure relief portion 61 may be a part of the housing 1. For example, the pressure relief portion 61 may be a wall portion or a part of a wall portion of the housing 1.

The first surface 611 and the second surface 612 of the pressure relief portion 61 are two opposite surfaces of the pressure relief portion 61 in the thickness direction Z thereof, and a distance between the first surface 611 and the second surface 612 is the thickness of the pressure relief portion 61. Taking an example in which the pressure relief portion 61 is the end cap 3, the first surface 611 may be an outer surface of the end cap 3 facing the outside of the battery cell 10, and the second surface 612 may be an inner surface of the end cap 3 facing the inside of the battery cell 10.

The pressure relief portion 61 may be provided with one stage of depressed groove 62 or may be provided with a plurality of stages of depressed grooves 62. If the pressure relief portion 61 is provided with a plurality of stages of depressed grooves 62, the plurality of stages of depressed grooves 62 are formed in the pressure relief portion 61 in sequence in the direction from the first surface 611 to the second surface 612, and the contours of the bottom surfaces of all the stages of depressed grooves 62 gradually decrease stage by stage. The depressed groove 62 may have various shapes, such as a rectangular shape and a circular shape. The depressed groove 62 in the pressure relief portion 61 may be formed in a variety of ways, such as stamping, and milling.

The pressure relief portion 61 may be provided with one stage of indented groove 63 or a plurality of stages of indented grooves 63. If the pressure relief portion 61 is provided with a plurality of stages of indented grooves 63, the plurality of stages of indented grooves 63 are formed in the pressure relief portion 61 in sequence in the direction from the first surface 611 to the second surface 612. The indented groove 63 may be a groove having various shapes, such as a circular arc shape, an H-shape, a U-shape and an annular shape. The indented groove 63 in the pressure relief portion 61 may be formed in a variety of ways, such as stamping, and milling. Taking an example of forming the at least one stage of depressed groove 62 and the at least one stage of indented groove 63 by stamping, the at least one stage of depressed groove 62 and the at least one stage of indented groove 63 may be stamped in the pressure relief portion 61 in sequence in the direction from the first surface 611 to the second surface 612. For example, as shown in FIG. 6, the pressure relief portion 61 is provided with one stage of indented groove 63 and one stage of depressed groove 62, and the indented groove 63 and the depressed groove 62 are both stamped, and the depressed groove 62 may be stamped in the first surface 611, and the indented groove 63 may be then stamped in the bottom surface of the depressed groove 62.

At least one stage of depressed groove 62 and at least one stage of indented groove 63 are formed in the pressure relief portion 61 in sequence in the direction from the first surface 611 to the second surface 612, and during forming, all the depressed grooves 62, and then all the indented grooves 63 may be formed in the pressure relief portions 61 in the direction from the first surface 611 to the second surface 612. It can be understood that the stage of indented groove 63 closest to the first surface 611 is formed in the bottom surface of the stage of depressed groove 62 farthest away from the first surface 611. If only one stage of indented groove 63 is formed in the pressure relief portion 61, this stage of indented groove 63 is the stage of indented groove 63 closest to the first surface 611, and also the stage of indented groove 63 farthest away from the first surface 611. If only one stage of depressed groove 62 is formed in the pressure relief portion 61, this stage of depressed groove 62 is the stage of depressed groove 62 closest to the first surface 611, and also the stage of depressed groove 62 farthest away from the first surface 611.

The groove bottom wall 613 of the stage of depressed groove 62 farthest away from the first surface 611 is the portion of the pressure relief portion 61 below the bottom surface of the stage of depressed groove 62 farthest away from the first surface 611, and after the stage of depressed groove 62 farthest away from the first surface 611 is formed in the pressure relief portion 61, the remaining portion of the area of the pressure relief portion 61 provided with the stage of depressed groove 62 is the groove bottom wall 613 of the stage of depressed groove 62 farthest away from the first surface 611. As shown in FIG. 6, taking an example in which the pressure relief portion 61 is provided with one stage of depressed groove 62, the portion of the pressure relief portion 61 below the bottom surface of the depressed groove 62 is the groove bottom wall 613 of the stage of depressed groove 62 farthest away from the first surface 611.

The opening area 6131 is a pressure relief region of the pressure relief portion 61. For the battery cell 10, when the internal pressure or temperature of the battery cell 10 reaches the threshold value, the opening area 6131 will be opened with the stage of indented groove 63 farthest away from the first surface 611 as a boundary, so as to realize pressure relief. The opening area 6131 is formed in the groove bottom wall 613 of the stage of depressed groove 62 farthest away from the first surface 611, and the opening area 6131 is a portion of the groove bottom wall 613 of the stage of depressed groove 62 farthest away from the first surface 611 that can be opened with the stage of indented groove 63 farthest away from the first surface 611 as the boundary at the time of pressure relief. The opening area 6131 may be opened in a disengaged manner or may be opened by turning same. The indented groove 63 is arranged along the edge of the opening area 6131. It can be understood that if a plurality of stages of indented grooves 63 are formed in the pressure relief portion 61, the stages of indented grooves 63 are substantially consistent in shape and are all arranged along the edge of the opening area 6131.

In an embodiment of the present application, at least one stage of depressed groove 62 and at least one stage of indented groove 63 are formed in the pressure relief portion 61 in sequence in the direction from the first surface 611 to the second surface 612, and during forming, the depressed grooves and the indented grooves 63 can be formed stage by stage, so that the pressure relief portion 61 is subjected to a reduced forming force, the risk of cracking of the pressure relief portion 61 is reduced, the pressure relief apparatus 6 is less likely to fail due to cracking occurring at the position where an indented groove 63 is provided, and the long-term reliability of the pressure relief apparatus 6 is thus improved.

When the depressed groove 62 and the indented groove 63 are formed in the pressure relief portion 61, the depressed groove 62 may be first formed in the pressure relief portion 61, and the indented groove 63 may be then formed in the pressure relief portion 61, so that the forming depth of each step of the groove is relatively small, the pressure relief portion 61 is subjected to a small forming force, the risk of cracking of the pressure relief portion 61 can be reduced, and the flatness of the first surface 611 can also be improved. After the depressed groove 62 is formed in the pressure relief portion 61, the pressure relief portion 61 is thinned in the area provided with the depressed groove 62, so that the rigidity of the remaining portion in this area is increased, the rigidity of the remaining portion of the pressure relief portion 61 is increased in the area provided with the indented groove 63 after the indented groove 63 is finally formed, the long-term reliability and the impact resistance are better, and the probability of damage due to external impact is reduced.

Since the indented groove 63 is arranged along the edge of the opening area 6131, and the opening area 6131 can opened with the stage of indented groove 63 farthest away from the first surface 611 as a boundary, the pressure relief area of the pressure relief portion 61 is increased, and the pressure relief rate of the pressure relief portion 61 is increased. In addition, since the groove bottom wall 613 of the stage of depressed groove 62 farthest away from the first surface 611 is provided with the opening area 6131, the depressed groove 62 can provide an avoidance space during the opening of the opening area 6131, and the opening area 6131 can still be opened for pressure relief even if the first surface 611 is blocked by an obstacle.

Figure 7:
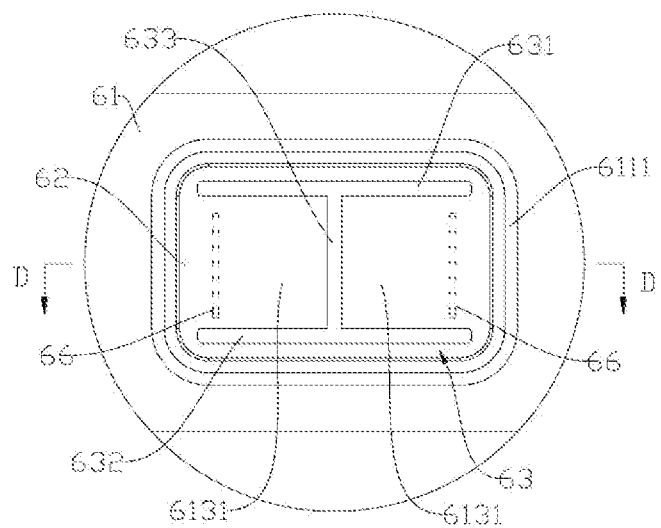
FIG. 7 is a partial enlarged view of part B of the pressure relief apparatus shown in FIG. 5.

In some embodiments, referring to FIG. 7, FIG. 7 is a partial enlarged view of part B of the pressure relief apparatus 6 shown in FIG. 5. The indented groove 63 includes a first groove segment 631, a second groove segment 632 and a third groove segment 633. The first groove segment 631 and the second groove segment 632 are arranged opposite to each other, the first groove segment 631 and the second groove segment 632 both intersect with the third groove segment 633, and the first groove segment 631, the second groove segment 632 and the third groove segment 633 are arranged along the edge of the opening area 6131.

The first groove segment 631, the second groove segment 632, and the third groove segment 633 may all be linear grooves, the first groove segment 631 may be parallel to the second groove segment 632, and the first groove segment 631 and the second groove segment 632 may be perpendicular to the third groove segment 633. The position where the first groove segment 631 intersects with the third groove segment 633 may be located at one end of the third groove segment 633, or may be located at a position offset from one end of the third groove segment 633 such that the end of the third groove segment 633 extends beyond the first groove segment 631 in an extending direction of the third groove segment 633. The position where the second groove segment 632 intersects with the third groove segment 633 may be located at the other end of the third groove segment 633, or may be located at a position offset from the other end of the third groove segment 633 such that the other end of the third groove segment 633 extends beyond the second groove segment 632 in the extending direction of the third groove segment 633. The third groove segment 633 may be located at the end of each of the first groove segment 631 and the second groove segment 632. For example, the first groove segment 631, the third groove segment 633 and the second groove segment 632 are connected in sequence to form a U-shape. The third groove segment 633 may also be located at the center of each of the first groove segment 631 and the second groove segment 632. For example, as shown in FIG. 7, the first groove segment 631, the second groove segment 632, and the third groove segment 633 form an H-shape.

It should be noted that, in an embodiment in which the pressure relief portion 61 is provided with a plurality of stages of indented grooves 63, it can be understood that among two adjacent stages of indented grooves 63, the first groove segment 631 of the stage of indented groove 63 away from the first surface 611 is arranged at the bottom surface of the first groove segment 631 of the stage of indented groove 63 close to the first surface 611, and the first groove segments 631 of the two adjacent stages have the same extending direction; the second groove segment 632 of the stage of indented groove 63 away from the first surface 611 is arranged at the bottom surface of the second groove segment 632 of the stage of indented groove 63 close to the first surface 611, and the second groove segments 632 of the two adjacent stages have the same extending direction; and the third groove segment 633 of the stage of indented groove 63 away from the first surface 611 is arranged at the bottom surface of the third groove segment 633 of the stage of indented groove 63 close to the first surface 611, and the third groove segments 633 of the two adjacent stages have the same extending direction.

In this embodiment, the opening area can be opened with the first groove segment, the second groove segment and the third groove segment as a boundary, increasing the pressure relief area of the pressure relief portion and increasing the pressure relief rate of the pressure relief portion.

Figure 8:
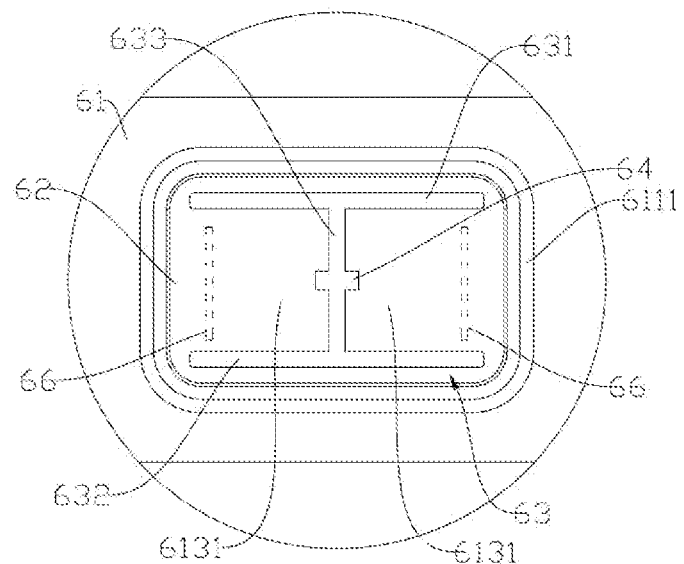
FIG. 8 is a partial enlarged view of a pressure relief apparatus according to some embodiments of the present application.

In some embodiments, referring to FIG. 8, FIG. 8 is a partial enlarged view of the pressure relief apparatus 6 provided in some embodiments of the present application. The pressure relief portion 61 is provided with a fourth groove segment 64. The fourth groove segment 64 is located between the first groove segment 631 and the second groove segment 632, and the fourth groove segment 64 intersects with the third groove segment 633.

The fourth groove segment 64 may be a linear groove. The fourth groove segment 64 is arranged corresponding to the indented groove 63. If the pressure relief portion 61 is provided with one stage of indented groove 63, the pressure relief portion 61 is correspondingly provided with one stage of fourth groove segment 64. If the pressure relief portion 61 is provided with a plurality of stages of indented grooves 63, the pressure relief portion 61 is correspondingly provided with a plurality of stages of fourth groove segments 64, each stage of indented groove 63 being correspondingly provided with one stage of fourth groove segment 64. Among the two adjacent stages of fourth groove segments 64 in the direction from the first surface 611 to the second surface 612, the stage of fourth groove segment 64 away from the first surface 611 is arranged at the bottom surface of the stage of fourth groove segment 64 close to the first surface 611, so that the widths of the plurality of stages of fourth groove segments 64 decrease stage by stage.

The fourth groove segment 64 may be parallel to the first groove segment 631 and the second groove segment 632 and perpendicular to the third groove segment 633.

Illustratively, the fourth groove segment 64 and third groove segment 633 intersect at the center of the fourth groove segment 64 and at the center of the third groove segment 633. The length of the fourth groove segment 64 is less than the lengths of the first groove segment 631 and the second groove segment 632.

The stress is more concentrated at the intersection of the fourth groove segment 64 and the third groove segment 633, and breakage is thus more likely to occur, so that the pressure relief portion 61 is broken along the third groove segment 633 from an intersection position of the third groove segment 633 and the fourth groove segment 64 during the pressure relief, and then broken along the first groove segment 631 and the second groove segment 632 after being broken along the third groove segment 633, to achieve quick pressure relief.

In this embodiment, the opening area 6131 can be opened with the first groove segment 631, the second groove segment 632 and the third groove segment 633 as a boundary, increasing the pressure relief area of the pressure relief portion 61 and increasing the pressure relief rate of the pressure relief portion 61.

In some embodiments, the fourth groove segment 64 intersects with the third groove segment 633 at the intersection position, and in the extending direction of the third groove segment 633, a distance from the intersection position to the first groove segment 631 is equal to a distance from the intersection position to the second groove segment 632.

In the extending direction of the third groove segment 633, the distance from the intersection position to the first groove segment 631 is the length of the portion of the third groove segment 633 between the fourth groove segment 64 and the first groove segment 631. In the extending direction of the third groove segment 633, the distance from the intersection position to the second groove segment 632 is the length of the portion of the third groove segment 633 between the fourth groove segment 64 and the second groove segment 632. Taking an example in which two ends of the third groove segment 633 are respectively connected to the first groove segment 631 and the second groove segment 632, the fourth groove segment 64 is arranged at the center of the third groove segment 633, so that the distance from the intersection position to the first groove segment 631 is equal to the distance from the intersection position to the second groove segment 632.

In this embodiment, since the distance from the intersection position of the fourth groove segment 64 and the third groove segment 633 to the first groove segment 631 is equal to the distance from the intersection position of the fourth groove segment 64 and the third groove segment 633 to the second groove segment 632, the pressure relief portion 61 can be broken simultaneously along the first groove segment 631 and the second groove segment 632 after being broken at the intersection position of the fourth groove segment 64 and the third groove segment 633 along the third groove segment 633, so that the opening area 6131 can be opened more quickly.

Figure 9:
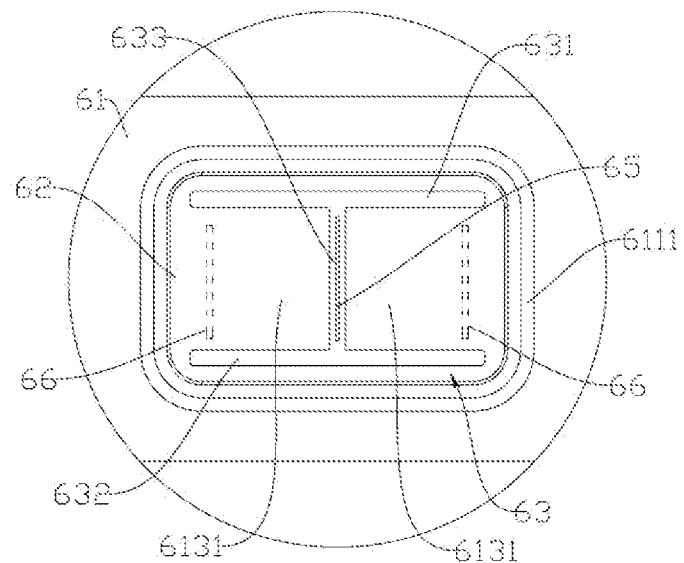
FIG. 9 is a partial enlarged view of a pressure relief apparatus according to some other embodiments of the present application.
Figure 10:
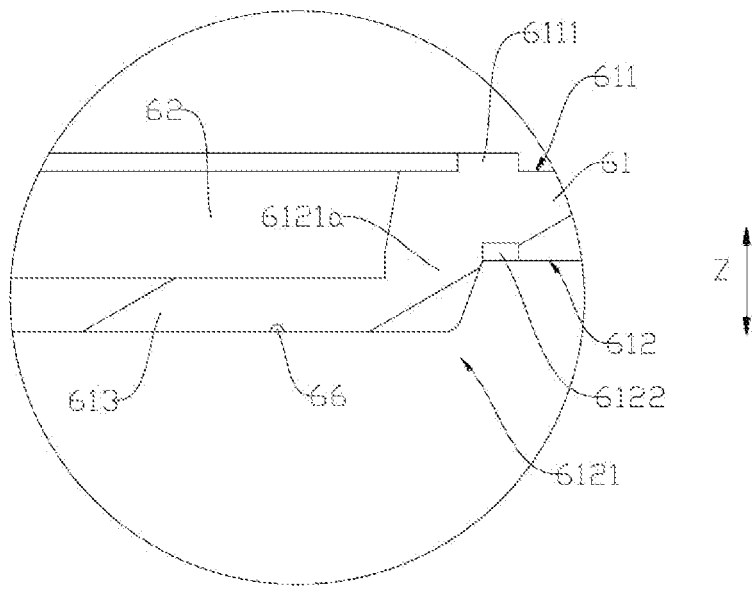
FIG. 10 is a partial enlarged view of part C of the pressure relief apparatus shown in FIG. 6.

Referring to FIG. 9, FIG. 9 is a partial enlarged view of the pressure relief apparatus 6 provided in some other embodiments of the present application. The pressure relief portion 61 is provided with a fifth groove segment 65, and the fifth groove segment 65 is formed in the bottom surface of one or two of the first groove segment 631, the second groove segment 632 and the third groove segment 633 in the stage of indented groove 63 farthest away from the first surface 611.

It can be understood that the fifth groove segment 65 is formed in the bottom surface of the stage of indented groove 63 farthest away from the first surface 611. Illustratively, in FIG. 9, the fifth groove segment 65 is formed in the bottom surface of the third groove segment 633 in the stage of indented groove 63 farthest away from the first surface 611.

The pressure relief portion 61 is weaker at the position where the fifth groove segment is provided and is more prone to breakage, so that the pressure relief portion 61 is broken first along the fifth groove segment 65 and then along the other groove segments than the fifth groove segment 65 during the pressure relief, thereby improving the timeliness of pressure relief.

In some embodiments, with continued reference to FIGS. 7-9, the first groove segment 631, the second groove segment 632, and the third groove segment 633 jointly define at least one opening area 6131.

The opening area 6131 is defined by the first groove segment 631, the second groove segment 632 and the third groove segment 633 together, and the indented groove 63 is not a closed structure. One or two opening areas 6131 may be defined by the first groove segment 631, the second groove segment 632 and the third groove segment 633. For example, if the first groove segment 631, the second groove segment 632 and the third groove segment 633 form a U-shaped structure, one opening area 6131 is provided. For another example, if the first groove segment 631, the second groove segment 632 and the third groove segment 633 form an H-shaped structure, two opening areas 6131 are provided.

In this embodiment, the opening area 6131 is defined by the first groove segment 631, the second groove segment 632 and the third groove segment 633 together, and the opening area 6131 can be opened by turning same. After being opened, the opening area 6131 is always connected to other areas of the pressure relief portion 61 and is less likely to fall off, so as to reduce the risk of splashing after the opening area 6131 is opened.

In some embodiments, with continued reference to FIGS. 7-9, the first groove segment 631, the second groove segment 632 and the third groove segment 633 define two opening areas 6131, and the two opening areas 6131 are respectively located on two sides of the third groove segment 633.

The first groove segment 631, the second groove segment 632 and the third groove segment 633 jointly define the two opening areas 6131, and the first groove segment 631, the second groove segment 632 and the third groove segment 633 may form the H-shaped structure. The third groove segment 633 and the first groove segment 631 may intersect at the center of the first groove segment 631, and the third groove segment 633 and the second groove segment 632 may intersect at the center of the second groove segment 632.

The two opening areas 6131 are respectively located on the two sides of the third groove segment 633, so that the two opening areas 6131 are delimited by the third groove segment 633, and after the pressure relief portion 61 is broken at the third groove segment 633, the two opening areas 6131 will be opened against each other along the first groove segment 631 and the second groove segment 632 so as to achieve pressure relief, so that the pressure relief area is increased, and the pressure relief rate of the pressure relief portion 61 can be effectively increased.

In some embodiments, referring to FIGS. 7-10, FIG. 10 is a partial enlarged view of part C of the pressure relief apparatus 6 shown in FIG. 6. The opening area 6131 is provided with a notched groove 66, and there is a distance between the notched groove 66 and the third groove segment 633 in the extending direction of the first groove segment 631.

The notched groove 66 may be located entirely in the opening area 6131 or partially in the opening area 6131.

Illustratively, the notched groove 66 is formed in a surface of the groove bottom wall 613 of the stage of depressed groove 62 farthest away from the first surface 611, which surface faces away from the first surface 611.

The notched groove 66 may extend in the extending direction of the third groove segment 633 such that the notched groove 66 is parallel to the third groove segment 633.

In the embodiment where the first groove segment 631, the second groove segment 632, and the third groove segment 633 jointly define one opening area 6131, one notched groove 66 may be correspondingly provided. As shown in FIG. 9, in the embodiment where the first groove segment 631, the second groove segment 632 and the third groove segment 633 jointly define two opening areas 6131, two notched grooves 66 may be correspondingly provided, each notched groove 66 being arranged corresponding to one opening area 6131.

In this embodiment, there is a distance between the notched groove 66 and the third groove segment 633 in the extending direction of the first groove segment 631, and the notched groove 66 is provided in the opening area 6131, so that the portion of the pressure relief portion 61 located in the opening area 6131 can be turned with the position of the pressure relief portion 61 where the notched groove 66 is located as the axis during the pressure relief of the pressure relief portion 61, and the pressure relief portion 61 can be opened more easily.

Figure 11:
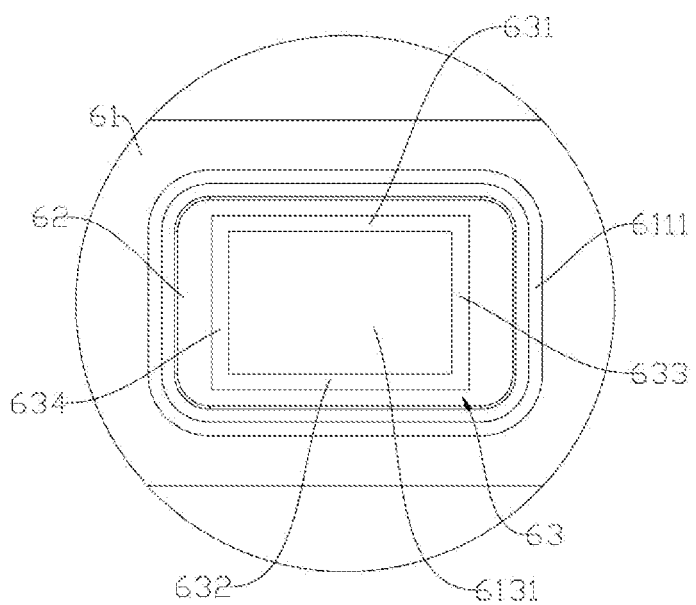
FIG. 11 is a partial enlarged view of a pressure relief apparatus according to further embodiments of the present application.

In some embodiments, referring to FIG. 11, FIG. 11 is a partial enlarged view of the pressure relief apparatus 6 provided in further embodiments of the present application. The indented groove 63 further includes a sixth groove segment 634. The sixth groove segment 634 is arranged opposite to the third groove segment 633, the first groove segment 631 and the second groove segment 632 both intersect with the sixth groove segment 634, and the first groove segment 631, the second groove segment 632, the third groove segment 633 and the sixth groove segment 634 jointly define the opening area 6131.

The sixth groove segment 634 may be arranged in parallel with the third groove segment 633. It is possible that the first groove segment 631, the third groove segment 633, the second groove segment 632 and the sixth groove segment 634 are connected end to end in sequence to form a closed structure. Of course, two ends of the first groove segment 631 may extend beyond the third groove segment 633 and the sixth groove segment 634 respectively, two ends of the second groove segment 632 may extend beyond the third groove segment 633 and the sixth groove segment 634 respectively, two ends of the third groove segment 633 may extend beyond the first groove segment 631 and the second groove segment 632 respectively, and two ends of the sixth groove segment 634 may extend beyond the first groove segment 631 and the second groove segment 632 respectively. Illustratively, in FIG. 11, the first groove segment 631, the third groove segment 633, the second groove segment 632, and the sixth groove segment 634 are connected end to end in sequence to form a rectangular structure.

It should be noted that in this embodiment, the pressure relief portion 61 may be provided with a fourth groove segment 64 or with no fourth groove segment 64.

The opening area 6131 is a closed area defined by the first groove segment 631, the second groove segment 632, the third groove segment 633 and the sixth groove segment 634, and the pressure relief portion 61 can be broken along the first groove segment 631, the second groove segment 632, the third groove segment 633 and the sixth groove segment 634 during the pressure relief of the pressure relief portion 61, so that the opening area 6131 can be opened in a disengaged manner, increasing the pressure relief area of the pressure relief portion 61 and the pressure relief rate of the pressure relief portion 61.

Figure 12:
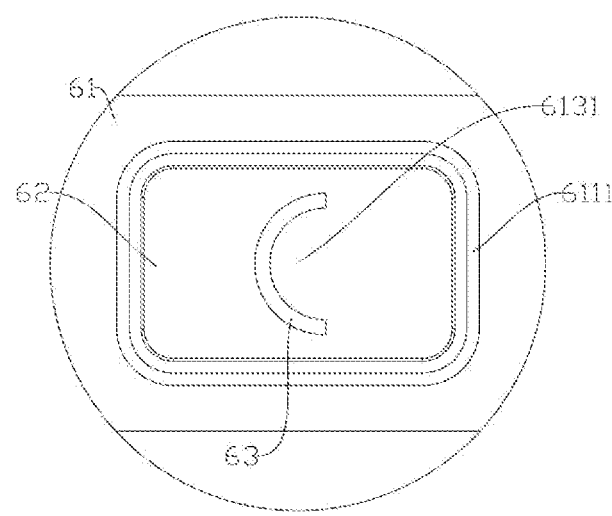
FIG. 12 is a partial enlarged view of a pressure relief apparatus according to still further embodiments of the present application.

In some embodiments, referring to FIG. 12, FIG. 12 is a partial enlarged view of the pressure relief apparatus 6 provided in still further embodiments of the present application. The indented groove 63 is a non-closed groove extending along a non-closed trajectory that is not connected end to end.

In this embodiment, the indented groove 63 may have various shapes, such as a circular arc shape and a U-shape.

In this embodiment, the indented groove 63 is a non-closed groove extending along the non-closed trajectory that is not connected end to end, the opening area 6131 can be opened by turning same. After being opened, the opening area 6131 is always connected to other areas of the pressure relief portion 61 and is less likely to fall off, so as to reduce the risk of splashing after the opening area 6131 is opened.

In some embodiments, with continued reference to FIG. 12, the indented groove 63 has a circular arc shape. The circular arc-shaped indented groove 63 has a simple structure and is easy to form. At the time of pressure relief, the pressure relief portion 61 can be quickly broken along the circular arc-shaped indented groove 63 to allow the opening area 6131 to be quickly opened.

Figure 13:
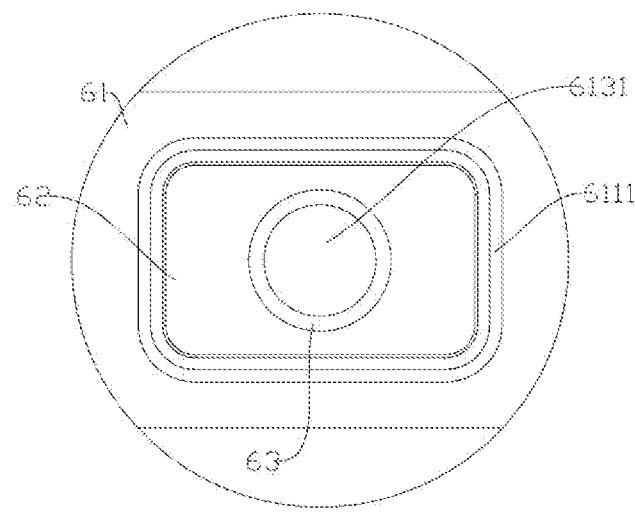
FIG. 13 is a partial enlarged view of a pressure relief apparatus according to other embodiments of the present application.

In some embodiments, referring to FIG. 13, FIG. 13 is a partial enlarged view of the pressure relief apparatus 6 provided in other embodiments of the present application. The indented groove 63 is a closed groove extending along a closed trajectory that is connected end to end.

In this embodiment, the indented groove 63 may have various shapes, such as a circular ring shape and a rectangular ring shape.

During the pressure relief of the pressure relief portion 61, the pressure relief portion 61 can be broken along the indented groove 63 so that the opening area 6131 can be opened in a disengaged manner, increasing the pressure relief area of the pressure relief portion 61 and the pressure relief rate of the pressure relief portion 61.

In some embodiments, with continued reference to FIG. 13, the indented groove 63 has a circular ring shape. The circular ring-shaped indented groove 63 has a simple structure and is easy to form. At the time of pressure relief, the pressure relief portion 61 can be quickly broken along the circular ring-shaped indented groove 63 to allow the opening area 6131 to be quickly opened.

Figure 14:
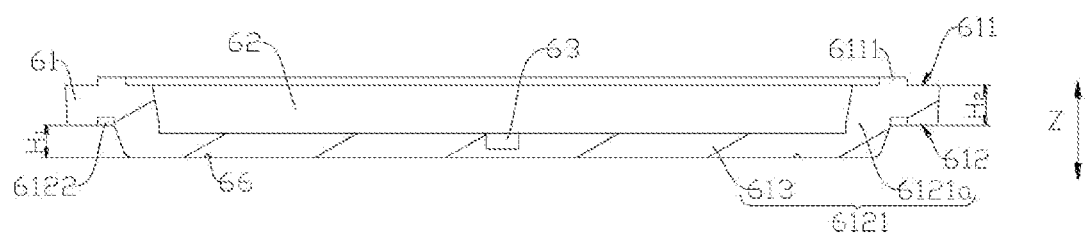
FIG. 14 is a cross-sectional view taken along D-D of the pressure relief apparatus shown in FIG. 7.

In some embodiments, referring to FIG. 14, FIG. 14 is a cross-sectional view taken along D-D of the pressure relief apparatus 6 shown in FIG. 7. The pressure relief portion 61 is provided with one stage of depressed groove 62. The depressed groove 62 is formed in the first surface 611.

The pressure relief portion 61 is provided with one stage of depressed groove 62, so this stage of depressed groove 62 is the stage of depressed groove 62 farthest away from the first surface 611, and the opening area 6131 is formed in the groove bottom wall 613 of the stage of depressed groove 62. The depressed groove 62 is formed in the first surface 611. It can be understood that the depressed groove 62 is recessed from the first surface 611 in a direction facing the second surface 612. When the pressure relief portion 61 is provided with one stage of depressed groove 62, one stage of indented groove 63 or a plurality of stages of indented grooves 63 may be formed in the pressure relief portion 61.

In this embodiment, the pressure relief portion 61 is provided with one stage of depressed groove 62, so that forming is simple, the production efficiency is improved, and the production cost is reduced.

In some embodiments, with continued reference to FIG. 14, the pressure relief portion 61 is provided with one stage of indented groove 63, and the indented groove 63 is formed in the bottom surface of the depressed groove 62.

In this embodiment, when the pressure relief portion 61 is provided with one stage of depressed groove 62, the pressure relief portion 61 is provided with one stage of indented groove 63, so this stage of indented groove 63 is the stage of indented groove 63 farthest away from the first surface 611. The indented groove 63 is formed in the bottom surface of the depressed groove 62. It can be understood that the indented groove 63 is recessed from the bottom surface of the depressed groove 62 in a direction away from the first surface 611.

In this embodiment, when the pressure relief portion 61 is provided with one stage of depressed groove 62, the pressure relief portion 61 is provided with one stage of indented groove 63, so that the forming is simple, the production efficiency is improved, and the production cost is reduced.

Figure 15:
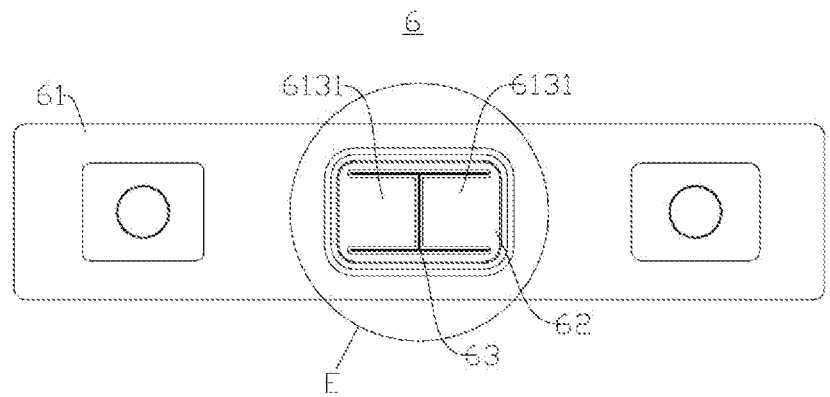
FIG. 15 is a top view of a pressure relief apparatus according to some other embodiments of the present application.
Figure 16:
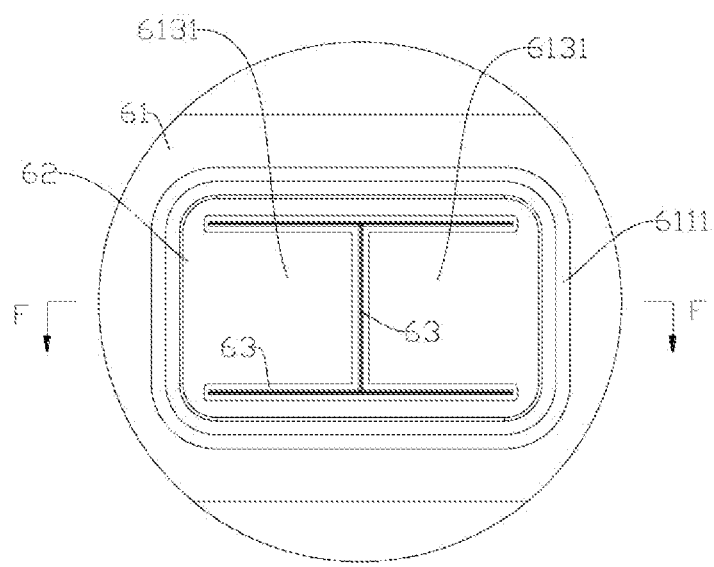
FIG. 16 is a partial enlarged view of part E of the pressure relief apparatus shown in FIG. 15.
Figure 17:
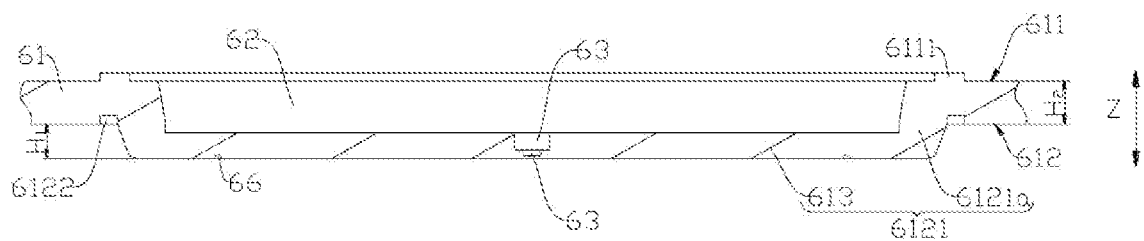
FIG. 17 is a cross-sectional view taken along F-F of the pressure relief apparatus shown in FIG. 16.

In some embodiments, referring to FIGS. 15-17, FIG. 15 is a top view of the pressure relief apparatus 6 provided in some other embodiments of the present application; FIG. 16 is a partial enlarged view of part E of the pressure relief apparatus 6 shown in FIG. 15; and FIG. 17 is a cross-sectional view taken along F-F of the pressure relief apparatus 6 shown in FIG. 16. The pressure relief portion 61 is provided with a plurality of stages of indented grooves 63, and the plurality of stages of indented grooves 63 are arranged in sequence in the direction from the first surface 611 to the second surface 612. Among two adjacent stages of indented grooves 63, the stage of indented groove 63 away from the first surface 611 is formed in the bottom surface of the stage of indented groove 63 close to the first surface 611, and the stage of indented groove 63 closest to the first surface 611 is formed in the bottom surface of the depressed groove 62.

When the pressure relief portion 61 is provided with one stage of depressed groove 62, the pressure relief portion 61 may be provided with two, three, four, five or another number of stages of indented grooves 63. As shown in FIG. 17, taking an example in which the pressure relief portion 61 is provided with two stages of indented grooves 63, the first stage of indented groove 63 (the stage of indented groove 63 closest to the first surface 611) is formed in the bottom surface of the depressed groove 62, and the second stage of indented groove 63 (the stage of indented groove 63 farthest away from the first surface 611) is formed in the bottom surface of the first stage of indented groove 63.

In this embodiment, the plurality of stages of indented grooves 63 are formed in sequence in the direction from the first surface 611 to the second surface 612, so that the forming depth of each stage of indented groove 63 can be decreased, the pressure relief portion 61 is thus subjected to a reduced forming force during the forming of each stage of indented groove 63, and the risk of cracking of the pressure relief portion 61 is reduced. During the stage-by-stage machining of the plurality of stages of indented grooves 63 in the direction from the first surface 611 to the second surface 612, the rigidity of the remaining portion of the area of the pressure relief portion 61 provided with the indented grooves 63 is accordingly increased as each stage of indented groove 63 is machined, and the rigidity of the remaining portion is increased after the pressure relief portion 61 is provided with the plurality of stages of indented grooves 63, so that the long-term reliability and the impact resistance are better, and the probability of damage due to external impact is reduced.

In some embodiments, the pressure relief portion 61 is provided with two or three stages of indented grooves 63.

It can be understood that when the pressure relief portion 61 is provided with one stage of depressed groove 62, the pressure relief portion 61 may be provided with two or three stages of indented grooves 63.

Illustratively, in FIG. 17, the pressure relief portion 61 is provided with two stages of indented grooves 63.

Figure 18:
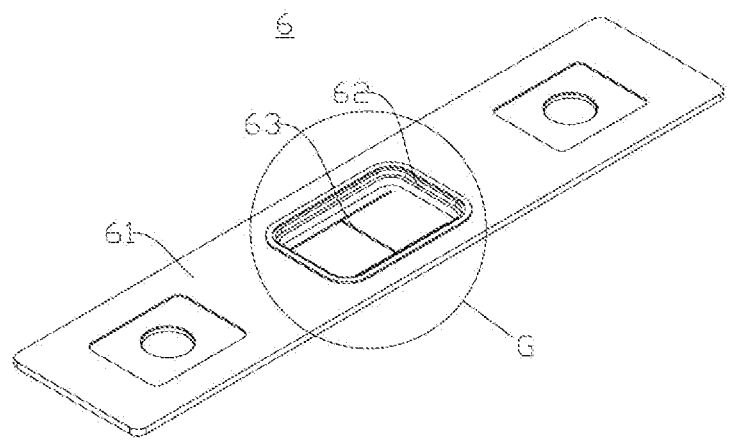
FIG. 18 is an isometric view of a pressure relief apparatus according to some other embodiments of the present application.
Figure 19:
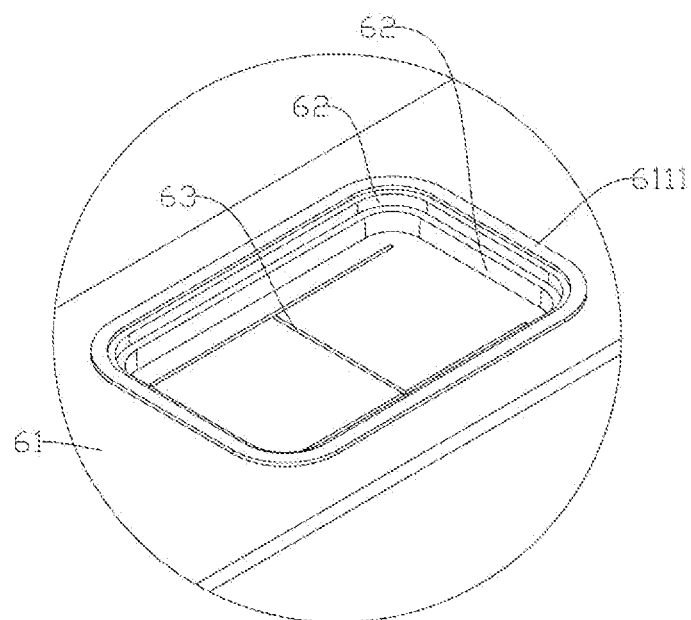
FIG. 19 is a partial enlarged view of part G of the pressure relief apparatus shown in FIG. 18.
Figure 20:
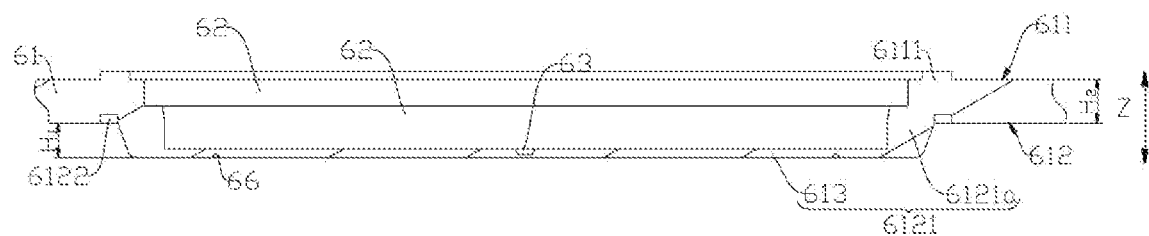
FIG. 20 is a partial cross-sectional view of the pressure relief apparatus shown in FIG. 18.

In some embodiments, referring to FIGS. 18-20, FIG. 18 is an isometric view of the pressure relief apparatus 6 provided in some other embodiments of the present application; FIG. 19 is a partial enlarged view of part G of the pressure relief apparatus 6 shown in FIG. 18; and FIG. 20 is a partial view of the pressure relief apparatus 6 shown in FIG. 18. The pressure relief portion 61 is provided with a plurality of stages of depressed grooves 62. The plurality of stages of depressed grooves 62 are formed in sequence in the direction from the first surface 611 to the second surface 612, and among two adjacent stages of depressed grooves 62, the stage of depressed groove 62 away from the first surface 611 is formed in the bottom surface of the stage of depressed groove 62 close to the first surface 611. In the thickness direction Z, the outermost stage of depressed groove 62 is formed in the first surface 611.

The pressure relief portion 61 may be provided with two, three, four, five or another number of stages of depressed grooves 62. The outermost stage of depressed groove 62 is recessed in the direction from the first surface 611 to the second surface 612. As shown in FIG. 20, taking an example in which the pressure relief portion 61 is provided with two stages of depressed grooves 62, the first stage of depressed groove 62 (the outermost stage of depressed groove 62) is formed in the first surface 611, and the second stage of depressed groove 62 is formed in the bottom surface of the first stage of depressed groove 62. The opening area 6131 is formed in the groove bottom wall 613 of the second stage of depressed groove 62.

When the pressure relief portion 61 is provided with a plurality of stages of depressed grooves 62, the pressure relief portion 61 may be provided with one stage of indented groove 63 or a plurality of stages of indented grooves 63.

Thanks to the fact that the pressure relief portion 61 is provided with a plurality of stages of depressed grooves 62, the forming depth of each stage of depressed groove 62 can be relatively small, the pressure relief portion 61 can be subjected to a reduced forming force during the forming of each stage of depressed groove 62, and the risk of cracking of the pressure relief portion 61 can be reduced. During the stage-by-stage machining of the plurality of stages of depressed grooves 62 in the direction from the first surface 611 to the second surface 612, the rigidity of the remaining portion of the area of the pressure relief portion 61 provided with the depressed grooves 62 is accordingly increased as each stage of depressed groove 62 is machined, so that the rigidity of the remaining portion of the area of the pressure relief portion 61 provided with the indented grooves 63 is further increased. Furthermore, among the plurality of stages of depressed grooves 62, the larger the contour size of the cross-section (perpendicular to the thickness direction Z of the pressure relief portion 61) of the outermost depressed groove 62, the more avoidance space can the plurality of stages of depressed grooves 62 provide for the opening of the opening area 6131.

In some embodiments, with continued reference to FIGS. 18-20, the pressure relief portion 61 is provided with one stage of indented groove 63. The indented groove 63 is formed in the bottom surface of the stage of depressed groove 62 farthest away from the first surface 611 in the thickness direction Z.

The stage of depressed groove 62 farthest away from the first surface 611 is the innermost stage of depressed groove 62.

In this embodiment, when the pressure relief portion 61 is provided with a plurality of stages of depressed grooves 62, the pressure relief portion 61 is provided with one stage of indented groove 63, so this stage of indented groove 63 is the stage of indented groove 63 farthest away from the first surface 611. As shown in FIG. 20, taking an example in which the pressure relief portion 61 is provided with two stages of depressed grooves 62, the first stage of depressed groove 62 (the outermost stage of depressed groove 62) is formed in the first surface 611, the second stage of depressed groove 62 (the stage of depressed groove 62 farthest away from the first surface 611) is formed in the bottom surface of the first stage of depressed groove 62, and the indented groove 63 is formed in the bottom surface of the second stage of depressed groove 62.

In this embodiment, when the pressure relief portion 61 is provided with a plurality of stages of depressed grooves 62, the pressure relief portion 61 is provided with one stage of indented groove 63, so that the forming is simple, the production efficiency is improved, and the production cost is reduced.

Figure 21:
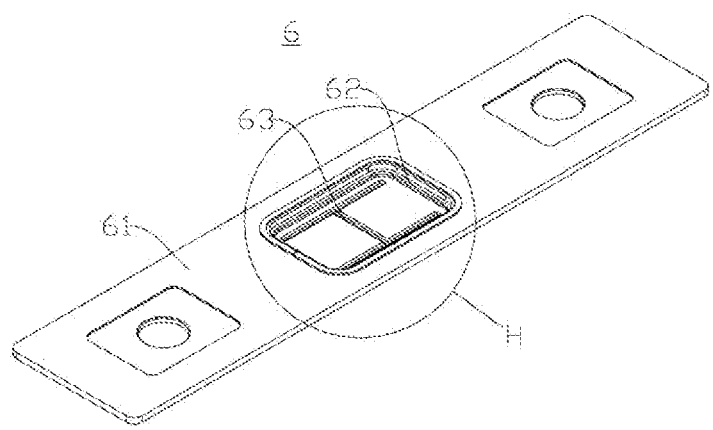
FIG. 21 is an isometric view of a pressure relief apparatus according to still further embodiments of the present application.
Figure 22:
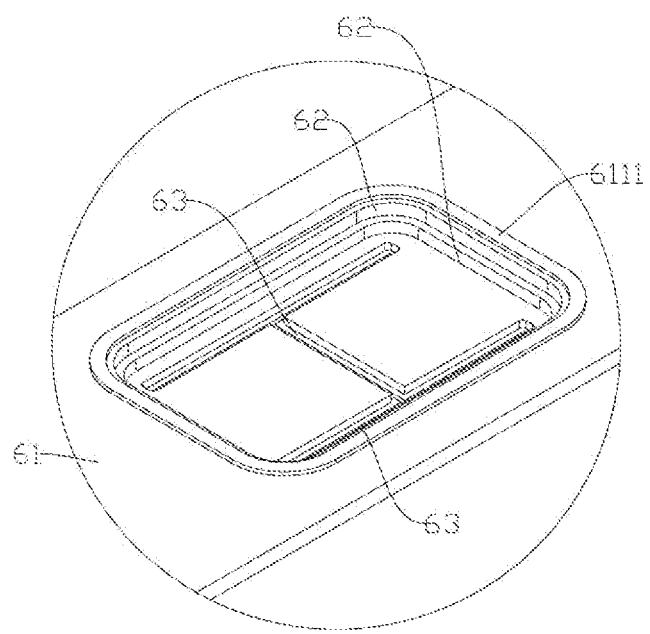
FIG. 22 is a partial enlarged view of part H of the pressure relief apparatus shown in FIG. 21.
Figure 23:
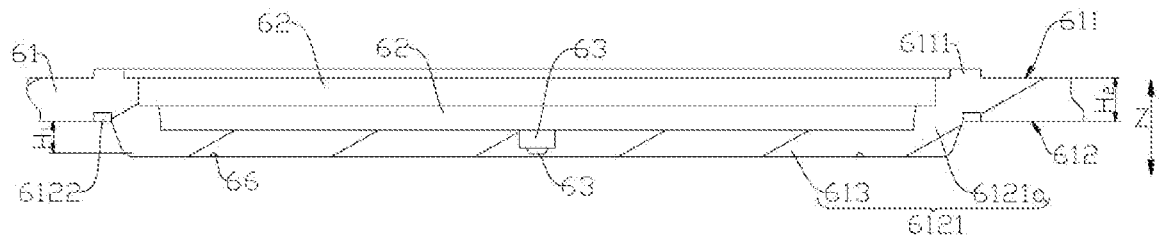
FIG. 23 is a partial cross-sectional view of the pressure relief apparatus shown in FIG. 22.

In some embodiments, referring to FIGS. 21-23, FIG. 21 is an isometric view of the pressure relief apparatus 6 provided in still further embodiments of the present application; FIG. 22 is a partial enlarged view of part H of the pressure relief device 6 shown in FIG. 21; and FIG. 23 is a partial cross-sectional view of the pressure relief apparatus 6 shown in FIG. 22. The pressure relief portion 61 is provided with a plurality of stages of indented grooves 63. The plurality of stages of indented grooves 63 are formed in sequence in the direction from the first surface 611 to the second surface 612, and among two adjacent stages of indented grooves 63, the stage of indented groove 63 away from the first surface 611 is formed in the bottom surface of the stage of indented groove 63 close to the first surface 611, and the stage of indented groove 63 closest to the first surface 611 is formed in the bottom surface of the stage of depressed groove 62 farthest away from the first surface 611.

When the pressure relief portion 61 is provided with a plurality of stages of depressed groove 62, the pressure relief portion 61 may be provided with two, three, four, five or another number of stages of indented grooves 63. As shown in FIG. 23, taking an example in which the pressure relief portion 61 is provided with two stages of indented grooves 63 and two stages of depressed grooves 62, the first stage of depressed groove 62 (the outermost stage of depressed groove 62) is formed in the first surface 611, the second stage of depressed groove 62 (the stage of depressed groove 62 farthest away from the first surface 611) is formed in the bottom surface of the first stage of depressed groove 62, the first stage of indented groove 63 (the stage of indented groove 63 closest to the first surface 611) is formed in the bottom surface of the second stage of depressed groove 62, and the second stage of indented groove 63 (the stage of indented groove 63 farthest away from the first surface 611) is formed in the bottom surface of the first stage of indented groove 63.

In this embodiment, the plurality of stages of indented grooves 63 are formed in sequence in the direction from the first surface 611 to the second surface 612, so that the forming depth of each stage of indented groove 63 can be decreased, the pressure relief portion 61 is thus subjected to a reduced forming force during the forming of each stage of indented groove 63, and the risk of cracking of the pressure relief portion 61 is reduced. During the stage-by-stage machining of the plurality of stages of indented grooves 63 in the direction from the first surface 611 to the second surface 612, the rigidity of the remaining portion of the area of the pressure relief portion 61 provided with the indented grooves 63 is accordingly increased as each stage of indented groove 63 is machined, and the rigidity of the remaining portion is increased after the pressure relief portion 61 is provided with the plurality of stages of indented grooves 63, so that the long-term reliability and the impact resistance are better, and the probability of damage due to external impact is reduced.

In some embodiments, the pressure relief portion 61 is provided with two or three stages of indented grooves 63.

It can be understood that when the pressure relief portion 61 is provided with a plurality of stages of depressed groove 62, the pressure relief portion 61 may be provided with two or three stages of indented grooves 63.

Illustratively, in FIG. 23, the pressure relief portion 61 is provided with two stages of indented grooves 63.

In some embodiments, the pressure relief portion 61 is provided with two or three stages of depressed grooves 62.

Illustratively, in FIG. 23, the pressure relief portion 61 is provided with two stages of depressed grooves 62.

In some embodiments, as shown in FIGS. 17 and 23, the pressure relief portion 61 is provided with a plurality of stages of indented grooves 63. The plurality of stages of indented grooves 63 are formed in sequence in the direction from the first surface 611 to the second surface 612, and among two adjacent stages of indented grooves 63, the stage of indented groove 63 away from the first surface 611 has a maximum width less than a minimum width of the stage of indented groove 63 close to the first surface 611.

It can be understood that when the pressure relief portion 61 is provided with a plurality of stages of indented grooves 63, the pressure relief portion 61 may be provided with one stage of depressed groove 62 or a plurality of stages of depressed grooves 62.

Among two adjacent stages of indented grooves 63 in the thickness direction Z of the pressure relief portion 61, the maximum width of the stage of indented groove 63 away from the first surface 611 is less than the minimum width of the stage of indented groove 63 close to the first surface 611, that is to say, the widths of the plurality of stages of indented grooves 63 decrease stage by stage in the direction from the first surface 611 to the second surface 612. The maximum width of the stage of indented groove 63 away from the first surface 611 does not limit the gradually varying width of the stage of indented groove 63 away from the first surface 611 among two adjacent stages of indented grooves 63, and when the width of the stage of indented groove 63 away from the first surface 611 does not vary in the thickness direction Z of the pressure relief portion 61, the width of the stage of indented groove 63 away from the first surface 611 may also be referred to as the maximum width. The minimum width of the stage of indented groove 63 close to the first surface 611 does not limit the gradually varying width of the stage of indented groove 63 close to the first surface 611 among two adjacent stages of indented grooves 63, and when the width of the stage of indented groove 63 close to the first surface 611 does not vary in the thickness direction Z of the pressure relief portion 61, the width of the stage of indented groove 63 close to the first surface 611 may also be referred to as the minimum width.

It should be noted that in an embodiment in which the indented groove 63 includes the first groove segment 631, the second groove segment 632 and the third groove segment 633, for two adjacent stages of indented grooves 63, it can be understood that the maximum width of the first groove segment 631 of the stage of indented groove 63 away from the first surface 611 is less than the minimum width of the first groove segment 631 of the stage of indented groove 63 close to the first surface 611; the maximum width of the second groove segment 632 of the stage of indented groove 63 away from the first surface 611 is less than the minimum width of the second groove segment 632 of the stage of indented groove 63 close to the first surface 611; and the maximum width of the third groove segment 633 of the stage of indented groove 63 away from the first surface 611 is less than the minimum width of the third groove segment 633 of the stage of indented groove 63 close to the first surface 611.

In this embodiment, the widths of all the stages of indented grooves 63 gradually decrease stage by stage in the direction from the first surface 611 to the second surface 612, and during forming, all the stages of indented grooves 63 may be formed in sequence in the direction from the first surface 611 to the second surface 612 to facilitate the forming of each stage of indented groove 63.

In some embodiments, the depressed groove 62 is a rectangular groove or a circular groove.

If the depressed groove 62 is a rectangular groove, a groove side face of the depressed groove 62 has a rectangular cross-section. If the depressed groove 62 is a circular groove, the groove side face of the depressed groove 62 has a circular cross-section. The cross-section is perpendicular to the thickness direction Z of the pressure relief portion 61.

Illustratively, in FIGS. 4-23, the depressed groove 62 is a rectangular groove.

In this embodiment, the depressed groove 62 is a rectangular groove or a circular groove, so that the depressed groove 62 has a simple structure and is easy to form, and can provide more avoidance space for the opening of the opening area 6131.

In some embodiments, referring to FIGS. 14, 17, 20 and 23, the first surface 611 is provided with a flange 6111. The flange 6111 surrounds the depressed groove 62 formed in the first surface 611.

The flange 6111 is a closed structure extending along a closed trajectory, and the flange 6111 may be a circular or rectangular ring structure. If the depressed groove 62 is a rectangular depressed groove, the flange 6111 may be correspondingly configured as a rectangular ring structure; and if the depressed groove 62 is a circular depressed groove, the flange 6111 may be correspondingly configured as a circular ring structure.

Illustratively, by comparing the groove side face of the stage of depressed groove 62 formed in the first surface 611 and the first surface 611 with an edge line, the edge line is located within the flange 6111, and there is a distance between the edge line and an inner side face of the flange 6111.

The flange 6111 can reinforce the pressure relief portion 61 and improve the deformation resistance of a pressure relief area of the pressure relief portion 61. In addition, the arrangement of the flange 6111 facilitates the mounting of a protective member to protect the opening area 6131.

In some embodiments, with continued reference to FIGS. 14, 17, 20 and 23, the pressure relief portion 61 partially protrudes from the second surface 612 in a direction away from the first surface 611 to form a protrusion 6121. The protrusion 6121 includes the groove bottom wall 613 and a reinforcement 6121a. The reinforcement 6121a is connected to the second surface 612 and surrounds the groove bottom wall 613.

The outer contour of the protrusion 6121 may have various shapes, such as a circular shape and a rectangular shape. It is possible that, when the depressed groove 62 is formed in the pressure relief portion 61 by means of stamping, the pressure relief portion 61 partially protrudes in the direction from the first surface 611 to the second surface 612 to form the protrusion 6121 protruding from the second surface 612. The stage of depressed groove 62 farthest away from the first surface 611 is located in the protrusion 6121, namely, the bottom surface of the stage of depressed groove 62 farthest away from the first surface 611 is farther away from the first surface 611 than the second surface 612, such that the reinforcement 6121a is arranged around the stage of depressed groove 62 farthest away from the first surface 611.

In the embodiment in which the pressure relief portion 61 is provided with a notched groove 66, the notched groove 66 may be formed in the surface of the protrusion 6121 facing away from the second surface 612.

In the embodiment in which the pressure relief portion 61 is provided with a flange 6111, it is possible that a projection of an inner side face of the flange 6111 in the thickness direction Z of the pressure relief portion 61 is located at the protrusion 6121, and the deformation resistance of the pressure relief area of the pressure relief portion 61 is further improved.

In this embodiment, the reinforcement 6121a is connected to the second surface 612, and can function to reinforce the groove bottom wall 613, improve the deformation resistance of the groove bottom wall 613, and reduce the risk of damage at the position of the groove bottom wall 613 provided with the indented groove 63 due to a stress.

In some embodiments, with continued reference to FIGS. 14, 17, 20 and 23, the second surface 612 is provided with a recess 6122. The recess 6122 is arranged around the protrusion 6121.

The recess 6122 is a closed structure extending along a closed trajectory, and the recess 6122 may have various shapes, such as a circular ring shape and a rectangular ring shape. If the outer contour of the protrusion 6121 is a circular structure, the recess 6122 may be correspondingly configured to have a circular ring shape; and if the outer contour of the protrusion 6121 is a rectangular structure, the recess 6122 may be correspondingly configured to have a rectangular ring shape.

Thanks to the provision of the recess 6122, the energy that is transferred by the stressed pressure relief portion 61 to the protrusion 6121 can be absorbed, and even if the pressure relief portion 61 deforms, it is less likely to transfer energy to the area provided with the indented groove 63.

In some embodiments, with continued reference to FIGS. 14, 17, 20 and 23, in the thickness direction Z, the protrusion 6121 protrudes from the second surface 612 by a height of $H_1$, and the distance between the first surface 611 and the second surface 612 is represented by Hz, where $H_1 \geq H_2$.

In the thickness direction Z, the height of the protrusion 6121 protruding from the second surface 612 is the distance between the surface of the protrusion 6121 facing away from the second surface 612 and the second surface 612, and the distance between the first surface 611 and the second surface 612 is the thickness of the pressure relief portion 61.

In this embodiment, $H_1 \geq H_2$ such that the height of the protrusion 6121 protruding from the second surface 612 is larger, enhancing the reinforcing effect of the reinforcement 6121a on the groove bottom wall 613.

In some embodiments, referring to FIGS. 4-23, the pressure relief portion 61 is an end cap 3. The end cap 3 is used for closing an opening of a housing 1.

It is possible that the first surface 611 is an outer surface of the end cap 3 and the second surface 612 is an inner surface of the end cap 3. It is also possible that the first surface 611 is the inner surface of the end cap 3 and the second surface 612 is the outer surface of the end cap 3. That is to say, the outer surface of the end cap 3 is the surface of the end cap 3 facing away from the housing 1, and the inner surface of the end cap 3 is the surface of the end cap 3 facing the housing 1.

In this embodiment, the end cap 3 has a pressure relief function, a pressure relief structure is formed by forming an indented groove 63 in the end cap 3, and the pressure relief structure has a better stability and a good long-term reliability.

In some embodiments, the first surface 611 is the surface of the end cap 3 facing away from the housing 1. The surface of the end cap 3 facing away from the housing 1 is the outer surface of the end cap 3, and even if the outer surface of the end cap 3 is blocked by an obstacle, the opening area 6131 can still be opened for the pressure relief.

Figure 24:
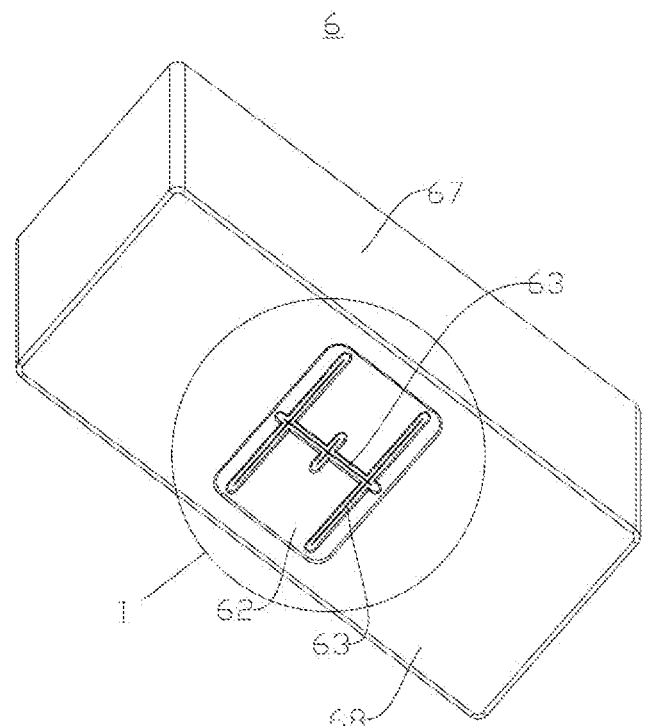
FIG. 24 is an isometric view of a pressure relief apparatus according to further embodiments of the present application.
Figure 25:
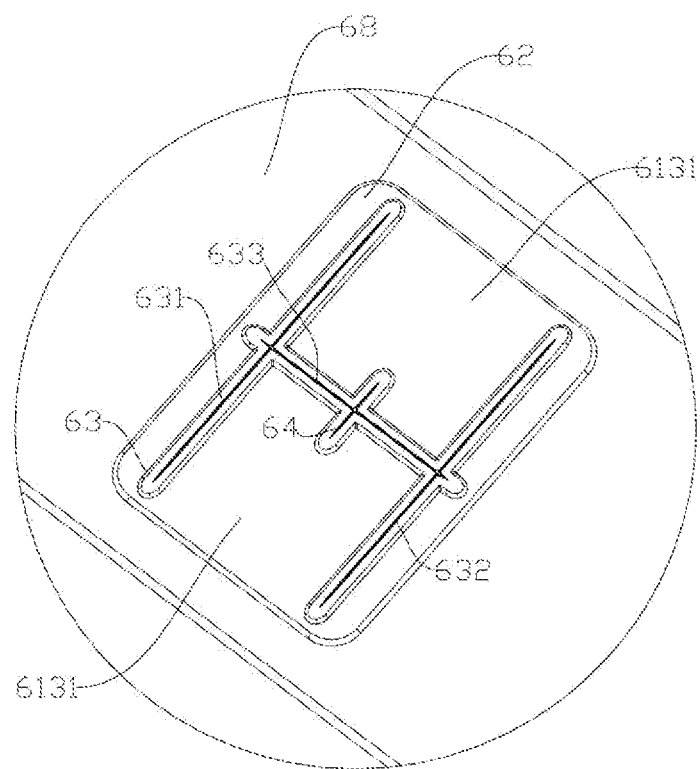
FIG. 25 is a partial enlarged view of part I of the pressure relief apparatus shown in FIG. 24.

In some embodiments, referring to FIGS. 24 and 25, FIG. 24 is an isometric view of the pressure relief apparatus 6 provided in some other embodiments of the present application; and FIG. 25 is a partial enlarged view of part I of the pressure relief apparatus 6 shown in FIG. 24. The pressure relief apparatus 6 is a housing 1, a receiving space is formed inside the housing 1, the housing 1 includes a plurality of wall portions which jointly define the receiving space for receiving an electrode assembly 2, and at least one of the wall portions is the pressure relief portion 61.

In the housing 1, one wall portion may be the pressure relief portion 61, or a plurality of wall portions may be the pressure relief portions 61. If a plurality of wall portions are the pressure relief portions 61, the housing 1 is correspondingly provided with a plurality of pressure relief portions 61. The first surface 611 of the pressure relief portion 61 may be an outer surface of the wall portion, or may be an inner surface of the wall portion. The outer surface of the wall portion is the surface of the wall portion facing away from the electrode assembly 2, and the inner surface of the wall portion is the surface of the wall portion facing the electrode assembly 2.

In this embodiment, the pressure relief apparatus 6 has both a receiving function for receiving the electrode assembly 2 and a pressure relief function.

In some embodiments, with continued reference to FIG. 24, the housing 1 includes a peripheral wall 67 and a bottom wall 68. The peripheral wall 67 surrounds an edge of the bottom wall 68, the peripheral wall 67 and the bottom wall 68 jointly define the receiving space, an opening is formed at the end of the peripheral wall 67 opposite to the bottom wall 68, and the bottom wall 68 is the pressure relief portion 61.

The peripheral wall 67 surrounds the edge of the bottom wall 68 such that the opening can be formed at the end of the housing 1 opposite to the bottom wall 68, and the end cap 3 is used for covering the opening. The peripheral wall 67 and the bottom wall 68 are of an integrally formed structure.

In the embodiment in which the housing 1 is a cylinder, the housing 1 may have two wall portions. One of the wall portions is a bottom wall 68, and the other wall portion is a cylindrical peripheral wall 67. As shown in FIG. 24, in the embodiment in which the housing 1 is a cuboid, the housing 1 may have five wall portions, namely, one bottom wall 68 and four side walls, with the four side walls being connected end to end to form a peripheral wall 67.

In this embodiment, since the bottom wall 68 is the pressure relief portion 61, the bottom wall 68 of the pressure relief apparatus 6 has the pressure relief function, facilitating the release of the pressure from the inside of the receiving space.

In some embodiments, the first surface 611 is an outer surface of the wall portion.

It can be understood that in the embodiment in which the bottom wall 68 is the pressure relief portion 61, the first surface 611 is the outer surface of the bottom wall 68.

When the depressed groove 62 and the indented groove 63 are formed in the wall portion, the indented groove 63 can be formed in the outer side of the wall portion, so that the forming is more convenient.

The embodiments of the present application provide a battery cell 10, including the pressure relief apparatus 6 provided in any one of the embodiments described above.

The embodiments of the present application provide a battery 100, including the battery cell 10 provided in any one of the embodiments described above.

The embodiments of the present application provide a power consuming device, including the battery 100 provided in any one of the embodiments described above.

The power consuming device may be any one of the aforementioned devices using the battery 100.

Referring to FIGS. 4-7, the embodiments of the present application provide an end cap 3. The end cap 3 is provided with a first surface 611 and a second surface 612 opposite to each other in a thickness direction Z thereof, the end cap 3 is provided with one stage of depressed groove 62 and one stage of indented groove 63, and the depressed groove 62 and the indented groove 63 are formed in sequence in the direction from the first surface 611 to the second surface 612. A groove bottom wall 613 of the depressed groove 62 is provided with an opening area 6131, the indented groove 63 is formed along an edge of the opening area 6131, and the opening area 6131 is configured to be openable with the indented groove 63 as a boundary. The depressed groove 62 is a rectangular groove. The indented groove 63 includes a first groove segment 631, a second groove segment 632 and a third groove segment 633. The first groove segment 631 and the second groove segment 632 are arranged opposite to each other, the first groove segment 631 and the second groove segment 632 both intersect with the third groove segment 633, the first groove segment 631, the second groove segment 632 and the third groove segment 633 are arranged along the edge of the opening area 6131, the first groove segment 631, the second groove segment 632 and the third groove segment 633 form an H shape, the first groove segment 631, the second groove segment 632 and the third groove segment 633 jointly define two opening areas 6131, and the two opening areas 6131 are respectively located on two sides of the third groove segment 633.

Referring to FIGS. 24 and 25, the embodiments of the present application further provide a housing 1. The housing 1 is of a cuboid structure, a bottom wall 68 of the housing 1 is provided with one stage of depressed groove 62 and two stages of indented grooves 63, and the one stage of depressed groove 62 and the two stages of indented grooves 63 are formed in sequence in the direction from a first surface 611 to a second surface 612. The depressed groove 62 is a rectangular groove, the depressed groove 62 is formed in the first surface 611, a groove bottom wall 613 of the depressed groove 62 is provided with an opening area 6131, the indented groove 63 is formed along an edge of the opening area 6131, and the opening area 6131 is configured to be openable with the stage of indented groove 63 farthest away from the first surface 611 as a boundary. The indented groove 63 includes a first groove segment 631, a second groove segment 632 and a third groove segment 633. The first groove segment 631 and the second groove segment 632 are arranged opposite to each other, the first groove segment 631 and the second groove segment 632 both intersect with the third groove segment 633, the first groove segment 631, the second groove segment 632 and the third groove segment 633 are arranged along the edge of the opening area 6131, the first groove segment 631, the second groove segment 632 and the third groove segment 633 jointly define two opening areas 6131, and the two opening areas 6131 are respectively located on two sides of the third groove segment 633. The pressure relief portion 61 is provided with a fourth groove segment 64. The fourth groove segment 64 is located between the first groove segment 631 and the second groove segment 632, and the fourth groove segment 64 intersects with the third groove segment 633.

It should be noted that the embodiments in the present application and features in the embodiments may be combined with each other without conflicts.

The above embodiments are only used to explain the technical solutions of the present application, and are not intended to limit the present application, and various modifications and changes of the present application may be made by those skilled in the art. Any modifications, equivalent substitutions, improvements, and the like made within the spirit and principle of the present application should fall within the scope of protection of the present application.

What is claimed is:

1. A pressure relief apparatus, comprising:
a pressure relief portion provided with a first surface and a second surface arranged opposite to each other in a thickness direction of the pressure relief portion; and
a plurality of stages of depressed grooves and at least one stage of indented groove, the plurality of stages of depressed grooves and the at least one stage of indented groove being formed in the pressure relief portion in sequence in a direction from the first surface to the second surface,
wherein:
a groove bottom wall of the stage of depressed groove farthest away from the first surface among the plurality of stages of depressed grooves is provided with an opening area, the indented groove is formed along an edge of the opening area, the opening area is configured to be openable with the stage of indented groove farthest away from the first surface as a boundary, among two adjacent stages of depressed grooves, the stage of depressed groove away from the first surface is formed in a bottom surface of the stage of depressed groove close to the first surface, and in the thickness direction, the outermost stage of depressed groove is formed in the first surface; and
the opening area is provided with a notched groove, the notched groove is formed in a surface of the groove bottom wall of the stage of depressed groove, and the surface of the groove bottom wall is farthest away from the first surface and faces away from the first surface.

2. The pressure relief apparatus according to claim 1, wherein the indented groove comprises a first groove segment, a second groove segment, and a third groove segment, the first groove segment and the second groove segment being arranged opposite to each other, the first groove segment and the second groove segment both intersecting with the third groove segment, and the first groove segment, the second groove segment, and the third groove segment being arranged along the edge of the opening area.

3. The pressure relief apparatus according to claim 2, wherein the pressure relief portion is provided with a fourth groove segment, the fourth groove segment being located between the first groove segment and the second groove segment and intersecting with the third groove segment.

4. The pressure relief apparatus according to claim 2, wherein the opening area is one of two opening areas defined by the first groove segment, the second groove segment, and the third groove segment, and located on two sides of the third groove segment, respectively.

5. The pressure relief apparatus according to claim 1, wherein the indented groove is formed in a bottom surface of the stage of depressed groove farthest away from the first surface in the thickness direction.

6. The pressure relief apparatus according to claim 1, wherein the pressure relief portion is provided with a plurality of stages of indented grooves formed in sequence in the direction from the first surface to the second surface, and among two adjacent stages of indented grooves, the stage of indented groove away from the first surface is formed in the bottom surface of the stage of indented groove close to the first surface, and the stage of indented groove closest to the first surface is formed in a bottom surface of the stage of depressed groove farthest away from the first surface.

7. The pressure relief apparatus according to any one of claim 6, wherein the plurality of stages of indented grooves include two or three stages of indented grooves.

8. The pressure relief apparatus according to claim 1, wherein the plurality of stages of depressed grooves include two or three stages of depressed grooves.

9. The pressure relief apparatus according to claim 1, wherein:
the pressure relief portion is provided with a plurality of stages of indented grooves formed in sequence in the direction from the first surface to the second surface, and
among two adjacent stages of indented grooves, the stage of indented groove away from the first surface has a maximum width less than a minimum width of the stage of indented groove close to the first surface.

10. The pressure relief apparatus according to claim 1, wherein the first surface is provided with a flange which surrounds the depressed groove formed in the first surface.

11. The pressure relief apparatus according to claim 1, wherein:
the pressure relief portion partially protrudes from the second surface in a direction away from the first surface to form a protrusion; and
the protrusion comprises the groove bottom wall and a reinforcement, the reinforcement being connected to the second surface and surrounding the groove bottom wall.

12. A battery cell, comprising the pressure relief apparatus according to claim 1.

13. A battery, comprising the battery cell according to claim 12.

14. A power consuming device, comprising the battery according to claim 13.

15. The pressure relief apparatus according to claim 3, wherein the fourth groove segment intersects with the third groove segment at an intersection position, and in an extending direction of the third groove segment, a distance from the intersection position to the first groove segment is equal to a distance from the intersection position to the second groove segment.

16. The pressure relief apparatus according to claim 2, wherein the pressure relief portion is provided with a fifth groove segment formed in a bottom surface of one or two of the first groove segment, the second groove segment and the third groove segment in the stage of indented groove farthest away from the first surface.

17. The pressure relief apparatus according to claim 2, wherein the first groove segment, the second groove segment, and the third groove segment jointly define the opening area.

18. The pressure relief apparatus according to claim 2, wherein the indented groove further comprises a sixth groove segment arranged opposite to the third groove segment, the first groove segment and the second groove segment both intersect with the sixth groove segment, and the first groove segment, the second groove segment, the third groove segment and the sixth groove segment jointly define the opening area.

19. The pressure relief apparatus according to claim 1, wherein the indented groove is a non-closed groove extending along a non-closed trajectory that is not connected end to end.

20. A pressure relief apparatus, comprising:
a pressure relief portion provided with a first surface and a second surface arranged opposite to each other in a thickness direction of the pressure relief portion; and
a plurality of stages of depressed grooves and at least one stage of indented groove, the plurality of stages of depressed grooves and the at least one stage of indented groove being formed in the pressure relief portion in sequence in a direction from the first surface to the second surface,
wherein:
a groove bottom wall of the stage of depressed groove farthest away from the first surface among the plurality of stages of depressed grooves is provided with an opening area, the indented groove is formed along an edge of the opening area, the opening area is configured to be openable with the stage of indented groove farthest away from the first surface as a boundary, among two adjacent stages of depressed grooves, the stage of depressed groove away from the first surface is formed in a bottom surface of the stage of depressed groove close to the first surface, and in the thickness direction, the outermost stage of depressed groove is formed in the first surface;
the pressure relief portion partially protrudes from the second surface in a direction away from the first surface to form a protrusion; and
the second surface is provided with a recess arranged around the protrusion, and the recess is a closed structure extending along a closed trajectory.

* * * * *